(12) United States Patent
Sagasaki

(10) Patent No.: US 10,684,606 B2
(45) Date of Patent: Jun. 16, 2020

(54) SELECTION APPARATUS

(71) Applicant: Mitsubishi Electric Corporation, Tokyo (JP)

(72) Inventor: Masakazu Sagasaki, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/348,870

(22) PCT Filed: Jan. 27, 2017

(86) PCT No.: PCT/JP2017/002946
§ 371 (c)(1),
(2) Date: May 10, 2019

(87) PCT Pub. No.: WO2018/138870
PCT Pub. Date: Aug. 2, 2018

(65) Prior Publication Data
US 2019/0278248 A1 Sep. 12, 2019

(51) Int. Cl.
*G05B 19/401* (2006.01)
*G05B 19/4155* (2006.01)
(Continued)

(52) U.S. Cl.
CPC .............. *G05B 19/401* (2013.01); *B23Q 7/12* (2013.01); *B23Q 15/00* (2013.01); *B23Q 15/04* (2013.01);
(Continued)

(58) Field of Classification Search
CPC ............ G05B 1/00; G05B 2219/45031; G05B 19/401; G05B 19/4155; G05B 19/41865;
(Continued)

(56) References Cited

U.S. PATENT DOCUMENTS 3,680,415 A   8/1972   Takano et al.
6,879,873 B2*  4/2005   Passant ............... B65G 49/068
                                        700/101
(Continued)

FOREIGN PATENT DOCUMENTS

JP   49-37233 B1   10/1974
JP   64-2802 A    1/1989
(Continued)

OTHER PUBLICATIONS

International Search Report and Written Opinion dated Apr. 25, 2017 for PCT/JP2017/002946 filed on Jan. 27, 2017, 8 pages including Translation of the International Search Report.
(Continued)

*Primary Examiner* — Michael J Brown
(74) *Attorney, Agent, or Firm* — Xsensus LLP

(57) ABSTRACT

A numerical control apparatus that is a selection apparatus causes, when an automatic lathe that fabricates a workpiece from a bar is unable to fabricate a workpiece that is a fabrication target from a remaining material that is a remaining part of the bar being machined, the automatic lathe to select another workpiece that the automatic lathe is able to fabricate from the remaining material. The numerical control apparatus includes a selection unit to select, when there are a plurality of other workpieces that are able to be fabricated from the remaining material, a workpiece to be fabricated on the basis of a length of the remaining material and priority.

20 Claims, 18 Drawing Sheets

(51) Int. Cl.
    *B23Q 7/12*      (2006.01)
    *B23Q 15/00*     (2006.01)
    *B23Q 15/04*     (2006.01)
    *B23Q 15/24*     (2006.01)
    *G05B 19/418*    (2006.01)
    *G05B 1/00*      (2006.01)

(52) U.S. Cl.
    CPC ......... *B23Q 15/24* (2013.01); *G05B 19/4155* (2013.01); *G05B 19/41865* (2013.01); *B23Q 2707/003* (2013.01); *B23Q 2717/003* (2013.01); *G05B 2219/34362* (2013.01)

(58) Field of Classification Search
    CPC .......... B23Q 7/12; B23Q 15/00; B23Q 15/04; B23Q 15/24
    USPC ........................................................ 700/171
    See application file for complete search history.

(56) References Cited

U.S. PATENT DOCUMENTS

2005/0019121 A1*  1/2005  Suttor ..................... B23C 5/10
                                                        409/131

2007/0270996 A1*  11/2007  Roise ..................... G06Q 10/06
                                                        700/171

FOREIGN PATENT DOCUMENTS

| | | |
|---|---|---|
| JP | 3-9921 Y2 | 3/1991 |
| JP | 6-332522 A | 12/1994 |
| JP | 2578596 Y2 | 5/1998 |
| JP | 10-263918 A | 10/1998 |
| JP | 2002-370124 A | 12/2002 |
| JP | 2003-175401 A | 6/2003 |
| JP | 2003-225804 A | 8/2003 |

OTHER PUBLICATIONS

Notification of Reasons for Refusal received for Japanese Patent Application No. 2017-564931, dated Feb. 6, 2018, 6 pages including English Translation.

Decision to Grant a Patent received for Japanese Patent Application No. 2017-564931, dated Jun. 5, 2018, 5 pages including English Translation.

Chinese Office Action dated Apr. 1, 2020 in Chinese Application No. 201780084211.X.

* cited by examiner

SELECTION APPARATUS

CROSS-REFERENCE TO RELATED APPLICATIONS

The present application is based on PCT filing PCT/JP2017/002946 filed Jan. 27, 2017, the entire contents of which are incorporated herein by reference.

FIELD

The present invention relates to a selection apparatus that selects a workpiece to be fabricated from a bar.

BACKGROUND

There are automatic lathes in use that fabricate a plurality of workpieces from a bar by cutting the bar while moving the bar in the longitudinal direction. In general, it is difficult for an automatic lathe to cut a bar to its end, and a remaining material is generated after the cutting. The remaining material cannot be subjected to cutting by the automatic lathe and it is discarded.

For this reason, the automatic lathe disclosed in Patent Literature 1 includes a detection unit that detects the length of a remaining bar. When workpieces having different lengths are fabricated, the automatic lathe disclosed in Patent Literature 1 selects a workpiece to be fabricated depending on the detection result of the detection unit, i.e., the length of a remaining material, to shorten the remaining material.

CITATION LIST

Patent Literature

Patent Literature 1: Utility Model Registration No. 2578596

SUMMARY

Technical Problem

However, the automatic lathe disclosed in Patent Literature 1 selectively fabricates a workpiece depending on the length of a remaining material; therefore, there is a problem in that it is impossible to fabricate a workpiece depending on the priority of the workpiece and to effectively use the remaining material.

The present invention has been made in view of the above and it is an object of the present invention to provide a selection apparatus capable of effectively using a remaining material.

Solution to Problem

In order to solve the above problem and achieve the object, an aspect of the present invention provides a selection apparatus that causes, when a machine tool that fabricates a workpiece from a bar is unable to fabricate a workpiece that is a fabrication target from a remaining material that is a remaining part of the bar being machined, the machine tool to select another workpiece that the machine tool is able to fabricate from the remaining material. The selection apparatus includes a selection unit to select, when there are a plurality of other workpieces that are able to be fabricated from the remaining material, a workpiece to be fabricated on a basis of a length of the remaining material and priority.

Advantageous Effects of Invention

A selection apparatus according to the present invention is capable of effectively using a remaining material.

DESCRIPTION OF EMBODIMENTS

Hereinafter, a selection apparatus according to embodiments is described in detail with reference to the drawings. Note that, this invention is not limited by the embodiments.

First Embodiment

Figure 1:
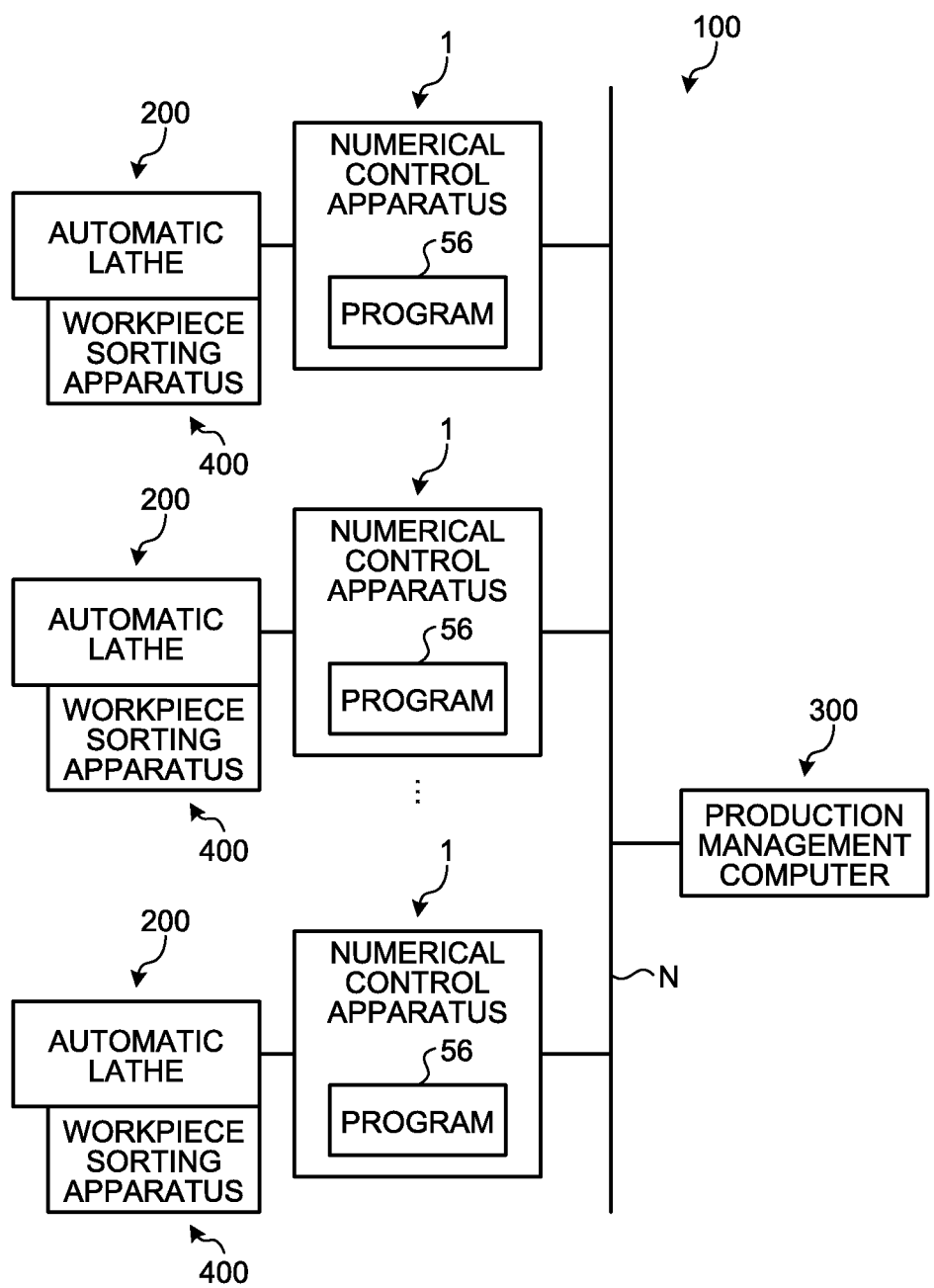
FIG. 1 is a diagram illustrating a configuration of a machining facility including a numerical control apparatus that is a selection apparatus according to a first embodiment.
Figure 2:
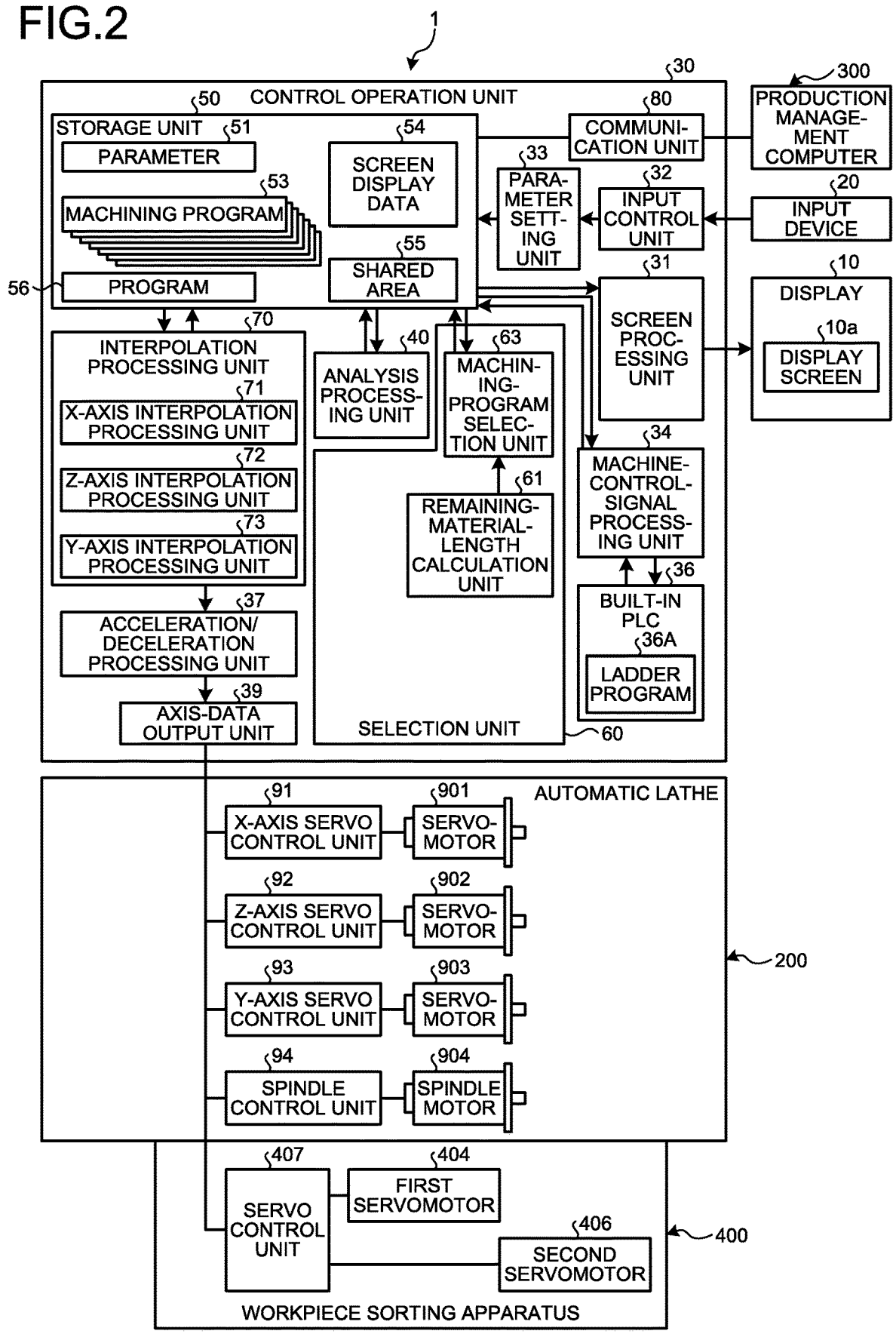
FIG. 2 is a functional block diagram illustrating a configuration of the numerical control apparatus that is the selection apparatus according to the first embodiment.
Figure 3:
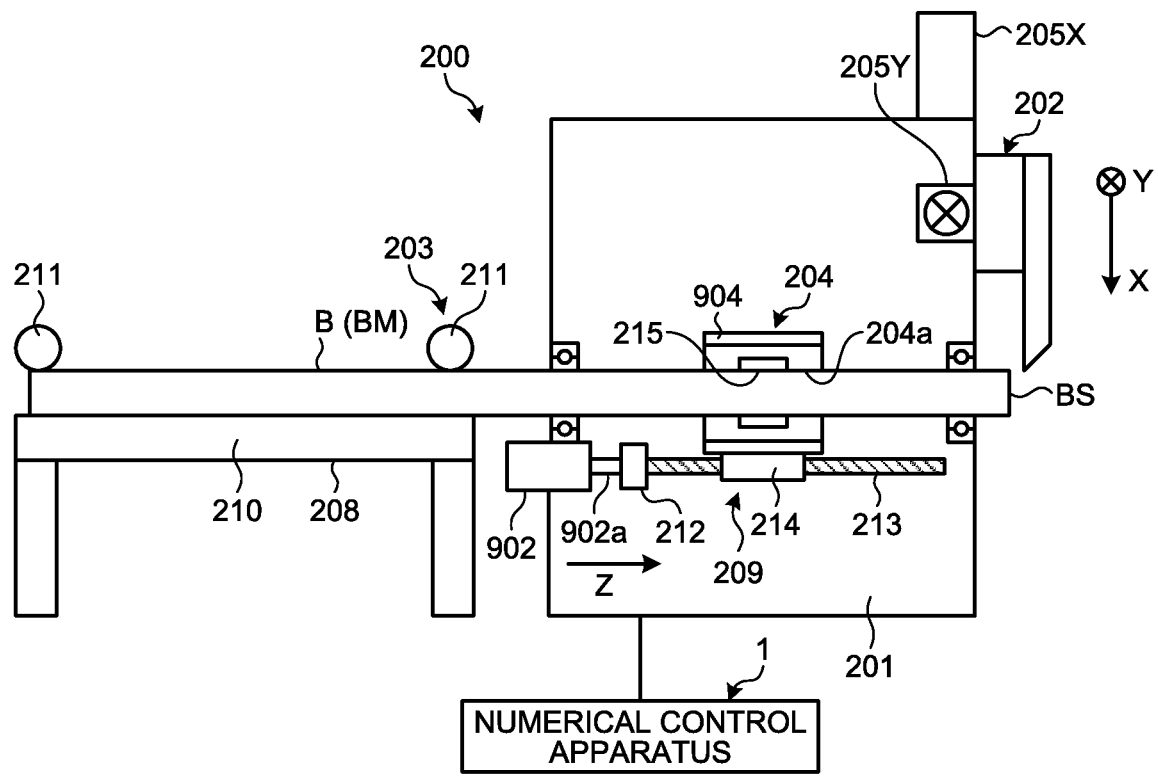
FIG. 3 is a side view illustrating a configuration of an automatic lathe of the machining facility illustrated in FIG. 1.
Figure 4:
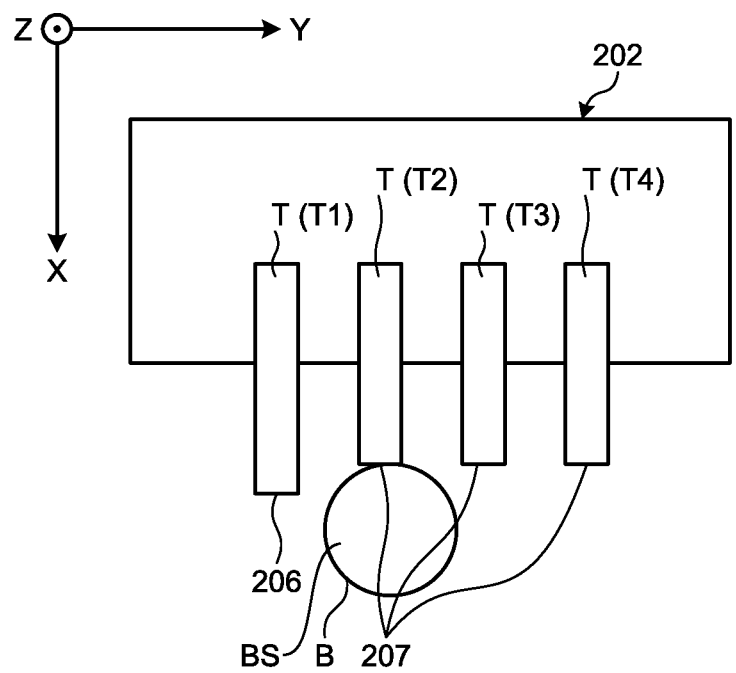
FIG. 4 is a front view of a tool post of the automatic lathe illustrated in FIG. 3.
Figure 5:
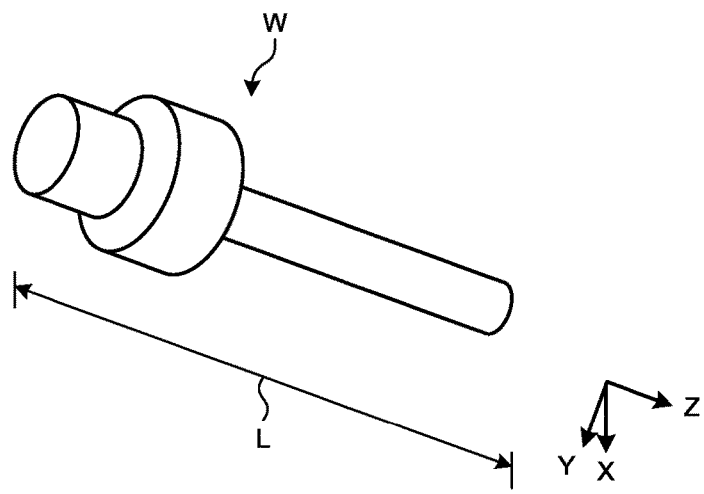
FIG. 5 is a perspective view illustrating an example of a workpiece to be fabricated using the automatic lathe illustrated in FIG. 3.
Figure 6:
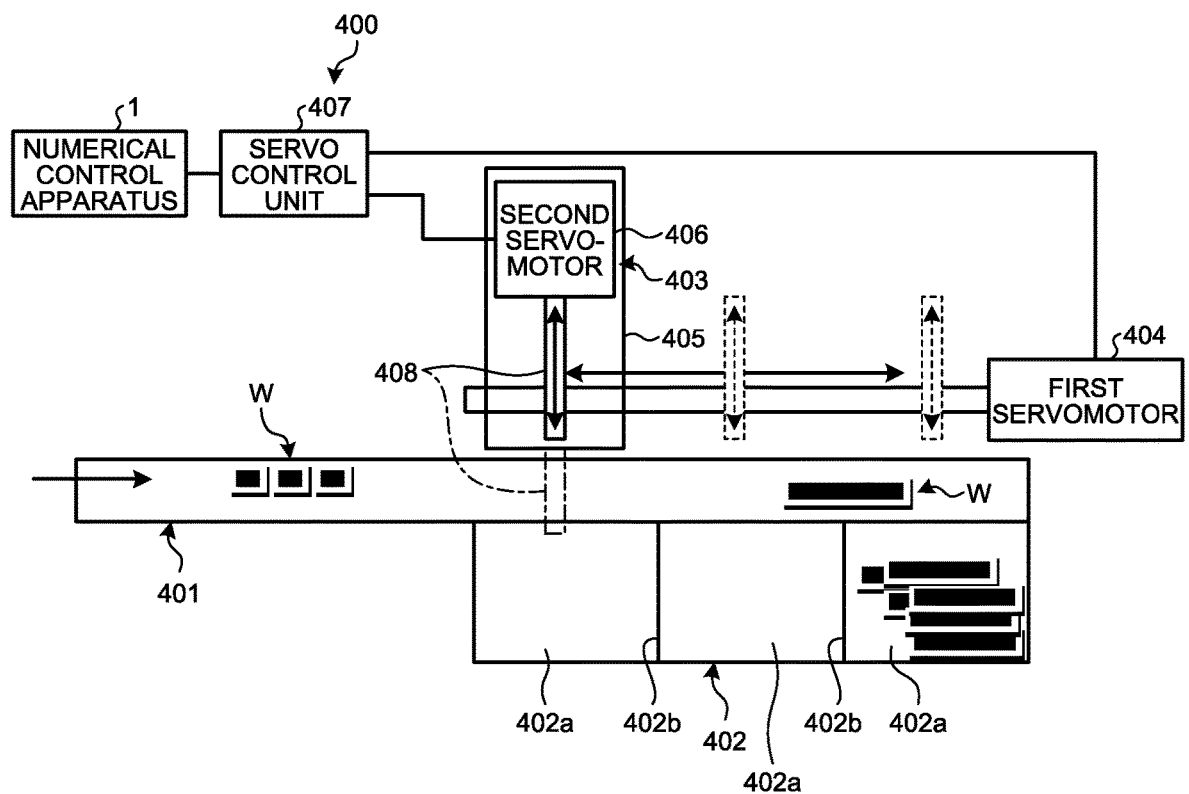
FIG. 6 is a plan view of a workpiece sorting apparatus of the machining facility illustrated in FIG. 1.

FIG. 1 is a diagram illustrating a configuration of a machining facility including a numerical control apparatus that is a selection apparatus according to a first embodiment. FIG. 2 is a functional block diagram illustrating a configuration of the numerical control apparatus that is the selection apparatus according to the first embodiment. FIG. 3 is a side view illustrating a configuration of an automatic lathe of the machining facility illustrated in FIG. 1. FIG. 4 is a front view of a tool post of the automatic lathe illustrated in FIG. 3. FIG. 5 is a perspective view illustrating an example of a workpiece to be fabricated using the automatic lathe illustrated in FIG. 3. FIG. 6 is a plan view of a workpiece sorting apparatus of the machining facility illustrated in FIG. 1.

As illustrated in FIGS. 1 and 2, a numerical control apparatus 1 that is the selection apparatus according to the first embodiment controls an automatic lathe 200 that is a machine tool constituting a machining facility 100. As illustrated in FIG. 1, the machining facility 100 includes a plurality of automatic lathes 200; the numerical control apparatuses 1 that each control a corresponding one of the automatic lathes 200; a production management computer 300 communicably connected to the numerical control apparatuses 1; and workpiece sorting apparatuses 400 corresponding to the automatic lathes 200. The machining facility 100 may include only one automatic lathe 200.

As illustrated in FIG. 3, the automatic lathe 200 includes an apparatus body 201 installed on the floor of a factory; a tool post 202 movably provided on the apparatus body 201; a material supply unit 203 that supplies a cylindrical or prismatic bar B toward the tool post 202; a headstock 204 that rotates the bar B about the central axis of the bar B; an X-direction feeding mechanism 205X that moves the tool post 202 in the X direction with respect to the apparatus body 201; and a Y-direction feeding mechanism 205Y that moves the tool post 202 in the Y direction with respect to the apparatus body 201. The tool post 202 is supported on the apparatus body 201 such that it is movable by a linear guide in the Y direction parallel to the horizontal direction and is supported on the apparatus body 201 such that it is movable by a linear guide in the X direction parallel to the vertical direction.

As illustrated in FIG. 4, a positioning tool 206 for positioning and machining tools 207 for machining are mounted on the tool post 202. The tool post 202 includes one positioning tool 206 and a plurality of machining tools 207. In the first embodiment, the tool post 202 includes three machining tools 207. The positioning tool 206 and the machining tools 207 are arranged on the tool post 202 at intervals in the Y direction. In the first embodiment, a mounting position T at which the positioning tool 206 of the tool post 202 is mounted is referred to as a first mounting position T1, and mounting positions T at which the three machining tools 207 of the tool post 202 are mounted are referred to as a second mounting position T2, a third mounting position T3, and a fourth mounting position T4.

The material supply unit 203 supplies the bar B toward the tool post 202 in the Z direction that is parallel to the horizontal direction and orthogonal to the Y direction. The bar B is made of metal and is formed in a cylindrical shape having a constant outer diameter. In the first embodiment, the shape of the bar B is not limited to a cylindrical shape but may be a prismatic shape. The material supply unit 203 includes a guide unit 208 that guides the bar B and a feed unit 209 that fixes the bar B to a chuck 215 and moves the bar B. The guide unit 208 includes a guide body 210 installed on the floor of the factory and guide rollers 211 that are provided rotatably on the guide body 210, sandwiches the bar B between the guide body 210 and themselves, and guides the moving direction of the bar B. The guide unit 208 has a structure for pushing out the bar B with a pushing arrow (not illustrated).

As illustrated in FIG. 3, the feed unit 209 includes a servomotor 902 attached to the apparatus body 201; a ball screw shaft 213 attached to an output shaft 902a of the servomotor 902 via a joint 212; and a Z-axis servo control unit 92 illustrated in FIG. 2 that controls the servomotor 902 in accordance with a Z-axis movement amount command input from the numerical control apparatus 1. The ball screw shaft 213 is arranged parallel to the Z direction. A nut 214 to which the headstock 204 is attached is screwed into the ball screw shaft 213. The Z-axis servo control unit 92 is a servo amplifier that converts the Z-axis movement amount command into a three-phase current and outputs it to the servomotor 902.

The headstock 204 is formed in a ring shape and passes the bar B through an inner hole 204a. The headstock 204 includes the chuck 215 that holds the bar B; a spindle motor 904 that freely rotates the chuck 215 chucking the bar B about the central axis of the bar B; and a spindle control unit 94 illustrated in FIG. 2 that controls the spindle motor 904 in accordance with a rotation command input from the numerical control apparatus 1. The spindle control unit 94 is a servo amplifier that converts the rotation command into a three-phase current and outputs it to the spindle motor 904. The rotation command is a rotation-direction movement command to rotate the bar B about the central axis of the bar B.

The material supply unit 203 moves the headstock 204 and the bar B in the Z direction by the servomotor 902 rotating the ball screw shaft 213 while the chuck 215 of the headstock 204 chucks the bar B. In the headstock 204, the spindle motor 904 rotates the bar B about its central axis while the chuck 215 chucks the bar B.

The X-direction feeding mechanism 205X moves the tool post 202 in the X direction. The X-direction feeding mechanism 205X includes a servomotor 901 illustrated in FIG. 2 that moves the tool post 202 in the X direction and an X-axis servo control unit 91 illustrated in FIG. 2 that controls the servomotor 901 in accordance with an X-axis movement amount command input from the numerical control apparatus 1. The X-axis servo control unit 91 is a servo amplifier that converts the X-axis movement amount command into a three-phase current and outputs it to the servomotor 901. The Y-direction feeding mechanism 205Y moves the tool post 202 in the Y direction. The Y-direction feeding mechanism 205Y includes a servomotor 903 illustrated in FIG. 2 that moves the tool post 202 in the Y direction and an Y-axis servo control unit 93 illustrated in FIG. 2 that controls the servomotor 903 in accordance with an Y-axis movement amount command input from the numerical control apparatus 1. The Y-axis servo control unit 93 is a servo amplifier that converts the Y-axis movement amount command into a three-phase current and outputs it to the servomotor 903.

Before fabricating a workpiece W from the bar B, the automatic lathe 200 according to the first embodiment brings an end surface BS of the bar B into contact with the positioning tool 206 to position the bar B. The automatic lathe 200 controls the servomotors 902, 903, and 901 in accordance with the Z-axis movement amount command, the Y-axis movement amount command, and the X-axis movement, which are generated by the numerical control apparatus 1 executing a machining program 53 illustrated in FIG. 2 for fabricating the workpiece W, controls the spindle motor 904 in accordance with the rotation command, and controls the chuck 215. The automatic lathe 200 controls the servomotors 901, 902, and 903, the spindle motor 904, and the chuck 215 such that the chuck 215 of the headstock 204 chucks the bar B, the feed unit 209 feeds the bar B toward the tool post 202 while the spindle motor 904 rotates the bar B, and the machining tools 207 attached to the tool post 202 cut the bar B in order to fabricate, from the bar B, the workpiece W exemplified in FIG. 5.

As described above, the automatic lathe 200 in the first embodiment is what is called a Swiss-type automatic lathe in which the headstock 204 moves in the Z direction, but may be a fixed type automatic lathe in which the headstock 204 is fixed. The automatic lathe 200 fabricates not only the workpiece W having the shape illustrated in FIG. 5 but also workpieces W having various shapes. The length L of the workpiece W in the Z direction is a machining length L of the workpiece W.

The workpiece W fabricated using the automatic lathe 200 is sorted by type of workpiece W by the workpiece sorting apparatus 400 illustrated in FIG. 6. The workpiece sorting apparatus 400 stores the fabricated workpiece W transferred from the automatic lathe 200 in a workpiece storage 402. As illustrated in FIG. 6, the workpiece sorting apparatus 400 includes a conveying belt 401 that conveys the workpiece W; the workpiece storage 402 arranged next to the conveying belt 401; and a part pusher 403. In the first embodiment, the conveying belt 401 conveys the workpiece W linearly.

The workpiece storage 402 is formed in a linear shape and is arranged parallel to the conveying belt 401. The workpiece storage 402 includes a plurality of storages 402a. The storages 402a each correspond to one type of workpiece W. One storage 402a corresponds to one type of workpiece W. The storages 402a are arranged in the longitudinal direction of the workpiece storage 402. In the first embodiment, the workpiece storage 402 is formed in a box shape and is open to the upper side, and the storages 402a adjacent to each other are partitioned by a partition wall 402b.

The part pusher 403 includes a first servomotor 404, a support stand 405, and a second servomotor 406. The first servomotor 404 is connected to the numerical control apparatus 1 via a servo control unit 407 and the automatic lathe 200. The first servomotor 404 moves the support stand 405 in the longitudinal direction of the workpiece storage 402 in accordance with the movement amount command from the numerical control apparatus 1. The second servomotor 406 is installed on the support stand 405 and is connected to the numerical control apparatus 1 via the servo control unit 407 and the automatic lathe 200. The second servomotor 406 moves, in accordance with the movement amount command from the numerical control apparatus 1, a bar-shaped feeder 408 connected to the output shaft in the direction crossing the longitudinal direction of the workpiece storage 402. The second servomotor 406 moves the feeder 408 between a retracted position indicated by a solid line in FIG. 6 where the tip of the feeder 408 is retracted from the conveying belt 401 and a pushing position indicated by a long dashed short dashed line in FIG. 6 where the workpiece W on the conveying belt 401 is pushed into the storage 402a of the workpiece storage 402. The part pusher 403 operates on the basis of the movement amount command from the numerical control apparatus 1 to store the workpiece W having a type corresponding to each storage 402a of the workpiece storage 402.

Figure 7:
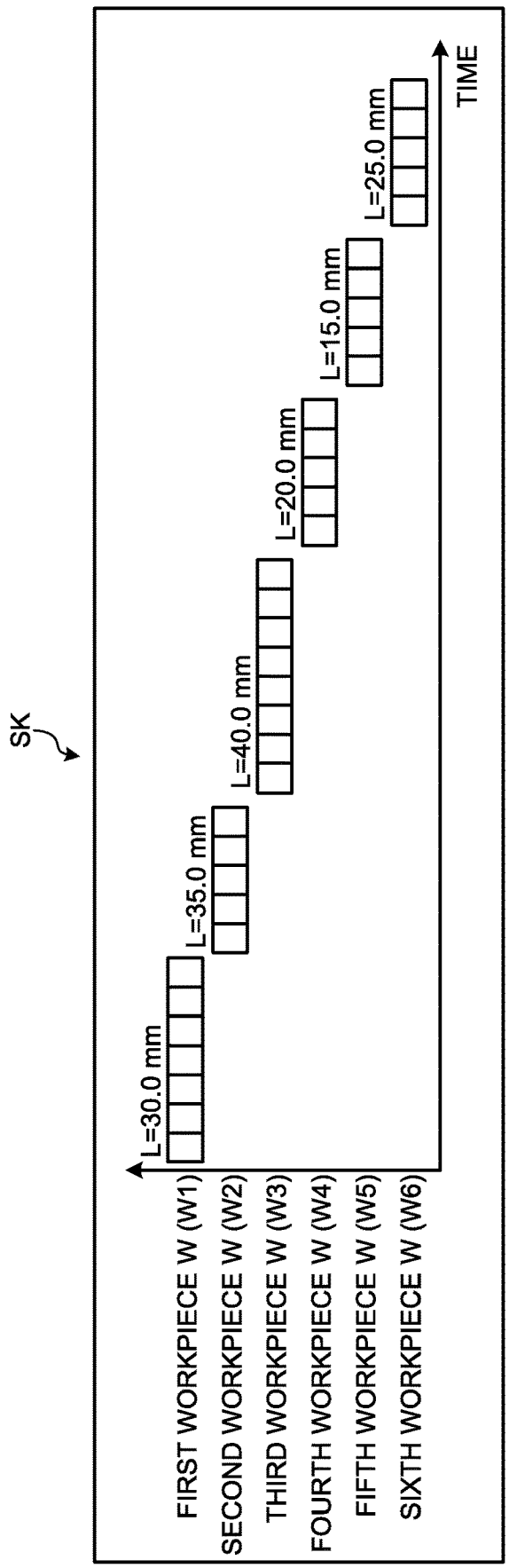
FIG. 7 is a diagram illustrating an example of a production schedule stored in a production management computer of the machining facility illustrated in FIG. 1.

The production management computer 300 of the machining facility 100 is a computer that executes programs, and stores a production schedule SK exemplified in FIG. 7 used when one or more automatic lathes 200 fabricate the workpiece W. FIG. 7 is a diagram illustrating an example of a production schedule stored in the production management computer of the machining facility illustrated in FIG. 1.

The production schedule SK defines the type and the number of workpieces W to be fabricated by each automatic lathe 200 in time series. The horizontal axis of the production schedule SK illustrated in FIG. 7 indicates time, and the vertical axis indicates the type and the number of workpieces W to be fabricated at each time. The production schedule SK illustrated in FIG. 7 indicates that seven first workpieces W1 having the machining length L of 30.0 mm are fabricated, then five second workpieces W2 having the machining length L of 35.0 mm are fabricated, then eight third workpieces W3 having the machining length L of 40.0 mm are fabricated, then five fourth workpieces W4 having the machining length L of 20.0 mm are fabricated, then five fifth workpieces W5 having the machining length L of 15.0 mm are fabricated, and then five sixth workpieces W6 having the machining length L of 25.0 mm are fabricated, but this is not a limitation. Thus, the first workpieces W1, the second workpieces W2, and the third workpieces W3 are workpieces specified in the production schedule SK.

The production management computer 300 is communicably connected to a plurality of numerical control apparatuses 1. In the first embodiment, the production management computer 300 is communicably connected to the numerical control apparatuses 1 by a computer network N. The computer network N is a network that connects the production management computer 300 and the numerical control apparatuses 1 such that they can communicate with each other. In the first embodiment, the computer network N is a Local Area Network (LAN), but is not limited thereto. The production management computer 300 stores the production schedule SK corresponding to each automatic lathe 200. The production management computer 300 outputs, to each numerical control apparatus 1, information designating the workpiece W to be fabricated using the automatic lathe 200 in accordance with the production schedule SK. Thus, the automatic lathe 200 is a machine tool for fabricating the workpiece W specified in the production schedule SK from the bar B.

The numerical control apparatus 1 is a computer that corresponds to the automatic lathe 200 and numerically controls the corresponding automatic lathe 200. As illustrated in FIG. 2, the numerical control apparatus 1 includes a display 10, an input device 20, and a control operation unit 30 that is a control unit. The display 10 includes a display screen 10a capable of displaying information. The input device 20 enables a user to input information to the control operation unit 30.

The control operation unit 30 includes a communication unit 80 communicably connected to the production management computer 300. The numerical control apparatus 1 selects a machining program 53 from a plurality of machining programs 53 and automatically activates it in accordance with the information input from the production management computer 300 in order for the automatic lathe 200 to fabricate the workpiece W. With the automatic activation, an analysis processing unit 40 analyzes the machining program 53 and transfers the analysis result to an interpolation processing unit 70 via a shared area 55. On the basis of the analysis result, the interpolation processing unit 70 generates an X-axis movement amount command, a Y-axis movement amount command, a Z-axis movement amount command, and a rotation command, adds an acceleration/deceleration command generated in an acceleration/deceleration processing unit 37, and supplies these commands to the servo control units 91, 92, and 93 and the spindle control unit 94 via an axis-data output unit 39. The X-axis servo control unit 91, the Y-axis servo control unit 93, the Z-axis servo control unit 92, and the spindle control unit 94 respectively drive the servomotors 901, 902, and 903 and the spindle motor 904 in accordance with the X-axis movement amount command, the Y-axis movement amount command, the Z-axis movement amount command, and the rotation command that are input from the control operation unit 30.

The control operation unit 30 includes a built-in programmable logic controller (PLC) 36, a machine-control-signal processing unit 34, a storage unit 50, the analysis processing unit 40, the interpolation processing unit 70, the acceleration/deceleration processing unit 37, the axis-data output unit 39, an input control unit 32, a screen processing unit 31, a parameter setting unit 33, and a selection unit 60.

Figure 8:
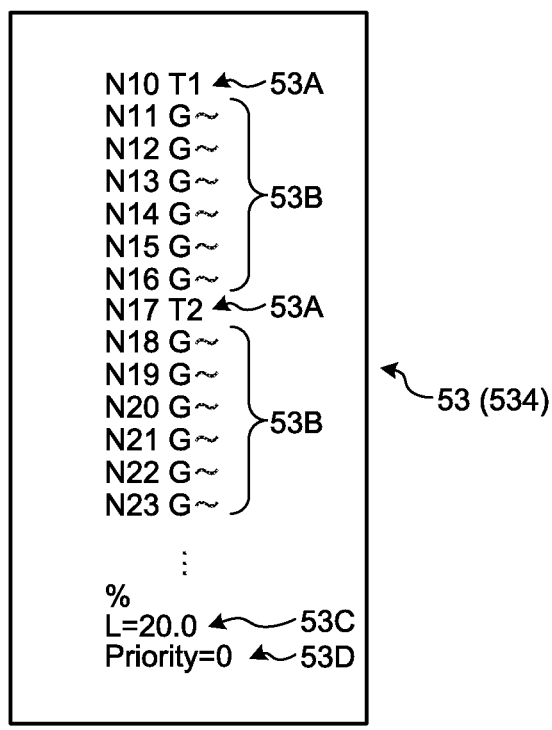
FIG. 8 is a diagram illustrating a part of a fourth machining program stored in a storage unit of the numerical control apparatus that is the selection apparatus according to the first embodiment.
Figure 9:
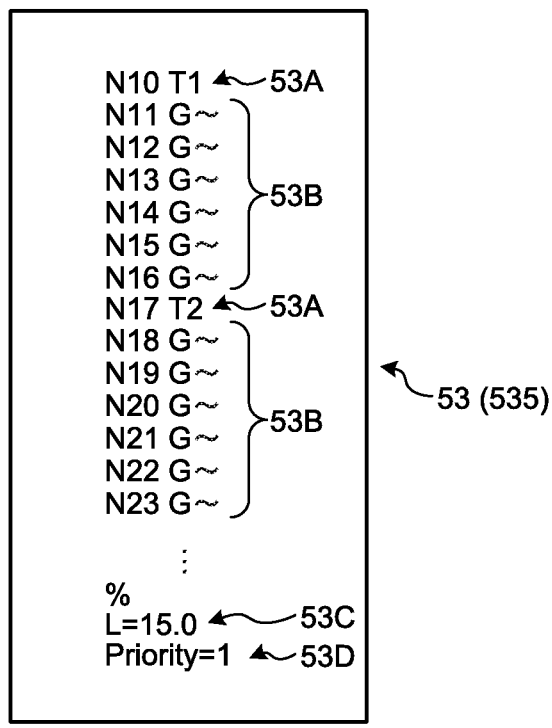
FIG. 9 is a diagram illustrating a part of a fifth machining program stored in the storage unit of the numerical control apparatus that is the selection apparatus according to the first embodiment.
Figure 10:
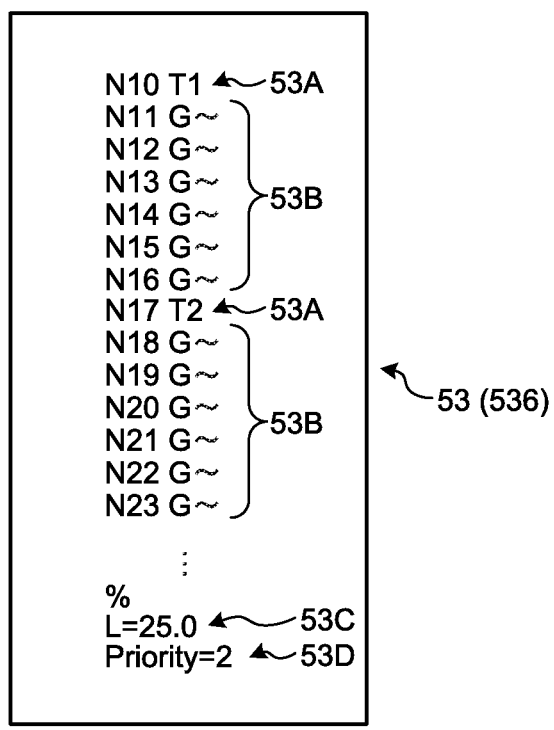
FIG. 10 is a diagram illustrating a part of a sixth machining program stored in the storage unit of the numerical control apparatus that is the selection apparatus according to the first embodiment.

The storage unit 50 stores a parameter 51, a plurality of machining programs 53, and screen display data 54, and has the shared area 55 as a work space. The storage unit 50 stores the machining programs 53 corresponding to workpieces W to be fabricated using the automatic lathes 200 and a program 56 to be executed when the selection unit 60 selects another workpiece W. In the first embodiment, the machining programs 53 stored in the storage unit 50 include the machining programs 53 for fabricating the first workpiece W1, the second workpiece W2, and the third workpiece W3 illustrated in FIG. 7. The storage unit 50 further stores, as the machining programs 53, a fourth machining program 534 illustrated in FIG. 8, a fifth machining program 535 illustrated in FIG. 9, and a sixth machining program 536 illustrated in FIG. 10. FIG. 8 is a diagram illustrating a part of the fourth machining program stored in the storage unit of the numerical control apparatus that is the selection apparatus according to the first embodiment. FIG. 9 is a diagram illustrating a part of the fifth machining program stored in the storage unit of the numerical control apparatus that is the selection apparatus according to the first embodiment. FIG. 10 is a diagram illustrating a part of the sixth machining program stored in the storage unit of the numerical control apparatus that is the selection apparatus according to the first embodiment.

The fourth machining program 534 is a machining program for fabricating the fourth workpiece W4 illustrated in FIG. 7 having a machining length L shorter than those of the first workpiece W1, the second workpiece W2, and the third workpiece W3. In the first embodiment, the machining length L of the fourth workpiece W4 is 20.0 mm. The fifth machining program 535 is a machining program for fabricating the fifth workpiece W5 illustrated in FIG. 7 having a machining length L shorter than those of the first workpiece W1, the second workpiece W2, and the third workpiece W3. In the first embodiment, the machining length L of the fifth workpiece W5 is 15.0 mm. The sixth machining program 536 is a machining program for fabricating the sixth workpiece W6 illustrated in FIG. 7 having a machining length L shorter than those of the first workpiece W1, the second workpiece W2, and the third workpiece W3. In the first embodiment, the machining length L of the sixth workpiece W6 is 25.0 mm. Note that, the fourth workpiece W4, the fifth workpiece W5, and the sixth workpiece W6 are other workpieces to be fabricated from the bar B.

The machining program 53 is described with a T code 53A, an S code, an M code, and a G code 53B. The T code 53A indicates selection of the machining tool 207 to be used for machining and a mounting position T at which the machining tool 207 to be used for machining is mounted in the first embodiment. The S code is a command to rotate the spindle, and the M code is a command to control the machine components, such as ON/OFF of the coolant. These are processed by the built-in PLC 36 and the machine-control-signal processing unit 34. In the first embodiment, the fourth machining program 534, the fifth machining program 535, and the sixth machining program 536 illustrated in FIGS. 8, 9, and 10 respectively are configured such that the T code 53A is indicated as the mounting position T1 or T2, but is not limited thereto. The G code 53B describes how to move the machining tool 207 with respect to the bar B in order for the automatic lathe 200 to fabricate the workpiece W from the bar B. In addition, the machining program 53 describes information 53C indicating the machining length L of the workpiece W to be fabricated with the machining program 53 in a predetermined block. That is, the information 53C indicating the machining length L of the workpiece W is a part of the machining program 53 for the automatic lathe 200 to fabricate the workpiece W, and is stored in the storage unit 50. In the present invention, the machining length L may be calculated from the result of drawing the workpiece W to be fabricated by using a simulation function of the numerical control apparatus 1.

Upon receiving, from the production management computer 300, the information specifying the workpiece W to be fabricated using the automatic lathe 200, the control operation unit 30 selects, from the machining programs 53 stored in the storage unit 50, the machining program 53 for fabricating the workpiece W specified by the information received from the production management computer 300, and automatically activates the selected machining program 53. The signal indicating the automatic activation is input to the machine-control-signal processing unit 34 via the built-in PLC 36. The machine-control-signal processing unit 34 instructs the analysis processing unit 40 via the storage unit 50 to start analyzing the machining program 53.

The analysis processing unit 40 loads the machining program 53 from the storage unit 50 and analyzes each block (each row) of the machining program 53. When the analyzed block (row) contains the T code 53A, the S code, or the M code other than the G code 53B, the analysis processing unit 40 transfers the analysis result to the built-in PLC 36 via the storage unit 50 and the machine-control-signal processing unit 34. When the analyzed row contains the G code 53B, the analysis processing unit 40 outputs the analysis result to the interpolation processing unit 70.

When receiving the T code 53A or the M code, the built-in PLC 36 performs machine control in accordance with a ladder program 36A. Then, the built-in PLC 36 outputs a signal for executing the next block of the machining program 53 to the machine-control-signal processing unit 34.

The interpolation processing unit 70 receives a position command, which is the analysis result, from the analysis processing unit 40, performs interpolation processing in response to the position command, and supplies a movement amount that is the result of the interpolation processing to the acceleration/deceleration processing unit 37. The interpolation processing unit 70 includes an X-axis interpolation processing unit 71 that performs interpolation processing in the X direction; a Y-axis interpolation processing unit 73 that performs interpolation processing in the Y direction; and a Z-axis interpolation processing unit 72 that performs interpolation processing in the Z direction.

The acceleration/deceleration processing unit 37 performs acceleration/deceleration processing in response to the result of the interpolation processing supplied from the interpolation processing unit 70. The acceleration/deceleration processing unit 37 outputs the acceleration/deceleration processing results on the X axis, the Y axis, and the Z axis to the axis-data output unit 39. The axis-data output unit 39 outputs the input acceleration/deceleration processing results to the respective servomotors 901, 902, and 903 via the servo control units 91, 92, and 93. For the spindle, a step command is output without acceleration/deceleration processing.

When the automatic lathe 200 cannot fabricate a workpiece W that is a fabrication target specified in the production schedule SK as a workpiece to be fabricated next from the remaining material BM of the bar B illustrated in FIG. 3, due to an insufficient length of the remaining material BM, the selection unit 60 of the numerical control apparatus 1 selects another workpiece W specified in the production schedule SK that the automatic lathe 200 can fabricate from the remaining material BM of the bar B, i.e., a workpiece W that is a fabrication target. The remaining material BM is a remaining part of the bar B being machined by the automatic lathe 200. In other words, the remaining material BM is the remaining part of the bar B from which at least one workpiece W has been fabricated. The control operation unit 30 of the numerical control apparatus 1 detects, for example, the initial length of the bar B or registers it in the storage unit 50, and subtracts the machining length L of the currently fabricated workpiece W at every fabrication so as to calculate the length of the remaining material BM. When the length of the remaining material BM becomes shorter than the machining length L of the workpiece W to be fabricated, the control operation unit 30 of the numerical control apparatus 1 detects that the length of the remaining material BM is insufficient. A remaining-material-length calculation unit 61 of the control operation unit 30 of the numerical control apparatus 1 is a remaining-material-length detection unit that detects the length of the remaining material BM.

In the first embodiment, each of the fourth machining program 534, the fifth machining program 535, and the sixth machining program 536 respectively for fabricating the fourth workpiece W4, the fifth workpiece W5, and the sixth workpiece W6, which are other workpieces W, describes, in a predetermined block as illustrated in FIG. 8, 9, or 10, priority-order information 53D indicating a priority order for fabricating workpieces W from the remaining material BM. The priority-order information 53D is described in each machining program 53 and is thus stored in the storage unit 50. In the first embodiment, the priority-order information 53D is described in each machining program 53 and stored in the storage unit 50. However, the priority-order information 53D may be stored in the storage unit of the production management computer 300 without being described in each machining program 53 in the present invention.

In the first embodiment, the priority order is indicated by zero and a natural number. The priority order being zero indicates the highest priority. In the first embodiment, the priority-order information 53D indicates that, among the fourth workpiece W4, the fifth workpiece W5, and the sixth workpiece W6, the fourth workpiece W4 has the highest priority order, the fifth workpiece W5 has the second priority order following the fourth workpiece W4, and the sixth workpiece W6 has the lowest priority order.

As illustrated in FIG. 2, the selection unit 60 includes the remaining-material-length calculation unit 61 and a machining-program selection unit 63. The remaining-material-length calculation unit 61 calculates the length of the remaining material BM. In the first embodiment, the remaining-material-length calculation unit 61 detects or registers the length of the bar B and subtracts the machining length L of the currently fabricated workpiece W at every fabrication so as to calculate the length of the remaining material BM.

On the basis of the length of the remaining material BM calculated by the remaining-material-length calculation unit 61 and the machining length L of the workpiece W to be fabricated next described in the machining program 53, the machining-program selection unit 63 determines whether the workpiece W specified in the production schedule SK can be fabricated from the remaining material BM. When the length of the remaining material BM calculated by the remaining-material-length calculation unit 61 is equal to or longer than the machining length L of the workpiece W to be fabricated next, the machining-program selection unit 63 determines that the workpiece W specified in the production schedule SK can be fabricated. When determining that the workpiece W specified in the production schedule SK can be fabricated from the remaining material BM, the machining-program selection unit 63 causes the control operation unit 30 to keep executing the machining program 53.

When the length of the remaining material BM calculated by the remaining-material-length calculation unit 61 is shorter than the machining length L of the workpiece W to be fabricated next described in the machining program 53, the machining-program selection unit 63 determines that the workpiece W specified in the production schedule SK cannot be fabricated. When determining that the workpiece W specified in the production schedule SK cannot be fabricated from the remaining material BM, the machining-program selection unit 63 acquires the machining lengths L described in the machining programs 53 for fabricating other workpieces W and selects another workpiece W that can be fabricated from the remaining material BM. The machining-program selection unit 63 selects another workpiece W having the machining length L equal to or shorter than the length of the remaining material BM. In this manner, the selection unit 60 selects, on the basis of the information 53C indicating the machining lengths L of other workpieces W stored in the storage unit 50 and the length of the remaining material BM, a workpiece W that can be fabricated from the remaining material BM from among the other workpieces W.

In addition, when a plurality of other workpieces W can be selected, the machining-program selection unit 63 acquires the priority-order information 53D described in the machining programs 53 for fabricating the other workpieces W, selects a workpiece having a higher priority, i.e., a higher priority order, in particular, a workpiece W having the highest priority, and automatically activates the machining program 53 for fabricating the workpiece W having the highest priority order. In this manner, when there are a plurality of other workpieces W that can be fabricated from the remaining material BM, the selection unit 60 selects a workpiece W on the basis of the priority. In addition, when there are a plurality of other workpieces W that can be fabricated from the remaining material BM, the selection unit 60 selects a workpiece having a higher priority order, in particular, a workpiece W having the highest priority order on the basis of the priority-order information 53D.

The priority is the order of fabricating workpieces W, i.e., which workpiece W is to be fabricated first. In the present embodiment, the priority described in the machining program is exemplified, but the priority may be the order of fabricating workpieces W specified in the production schedule SK. In addition, the priority may be a priority order of interrupt information that is the information on a workpiece W to be fabricated by interruption in the middle of the fabricating order of workpieces W specified in the production schedule SK. The priority is determined by an operator of the automatic lathe 200 or by the production management computer 300 illustrated in FIG. 1.

In addition, the control operation unit 30 of the numerical control apparatus 1 is also a control unit that controls the first servomotor 404 and the second servomotor 406 of the workpiece sorting apparatus 400 such that the workpiece sorting apparatus 400 stores a workpiece W in the corresponding storage 402a of the workpiece storage 402. The control operation unit 30 of the numerical control apparatus 1 receives the information indicating the executing machining program 53 from the machining-program selection unit 63 and selects the storage 402a corresponding to the workpiece W to be fabricated with the input machining program 53. The control operation unit 30 of the numerical control apparatus 1 controls the first servomotor 404 and the second servomotor 406 such that the workpiece sorting apparatus 400 stores the workpiece W in the selected storage 402a.

Figure 11:
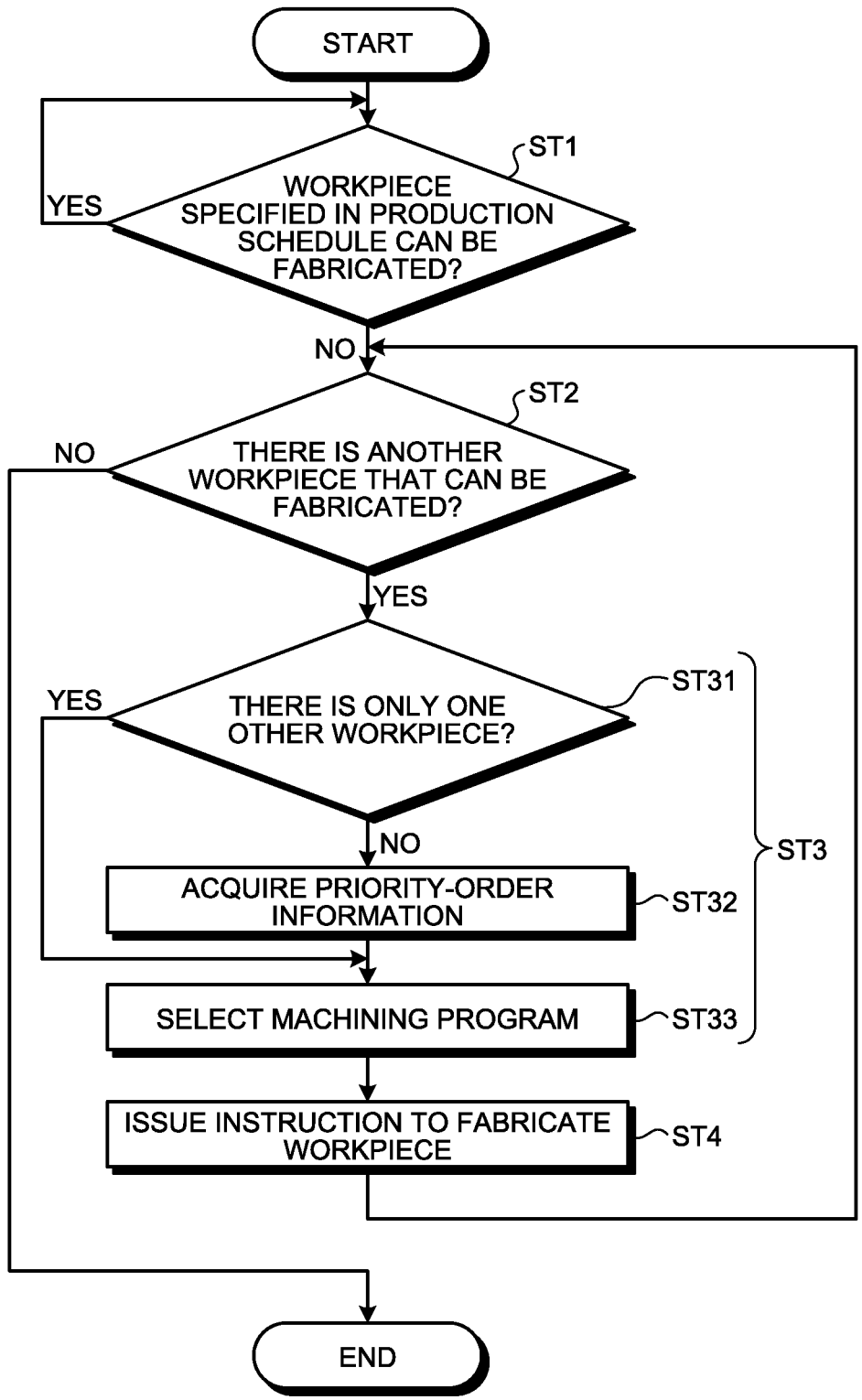
FIG. 11 is a flowchart illustrating a method for selecting another workpiece performed by a selection unit of the numerical control apparatus that is the selection apparatus according to the first embodiment.

Next, a description will be given of a method for selecting another workpiece W performed by the numerical control apparatus 1 when the workpiece W specified in the production schedule SK cannot be fabricated from the remaining material BM of the bar B. FIG. 11 is a flowchart illustrating a method for selecting another workpiece performed by the selection unit of the numerical control apparatus that is the selection apparatus according to the first embodiment.

The selection unit 60 of the numerical control apparatus 1 loads and executes the program 56 stored in the storage unit 50 while the automatic lathe 200 is fabricating the workpiece W. The program 56 is for selecting, when the automatic lathe 200 cannot fabricate the workpiece W specified in the production schedule SK from the remaining material BM of the bar B, another workpiece W that the automatic lathe 200 can fabricate from the remaining material BM. Before each workpiece W specified in the production schedule SK is fabricated, the selection unit 60 determines whether the workpiece W specified in the production schedule SK as a workpiece to be fabricated next can be fabricated from the remaining material BM of the bar B (step ST1). In step ST1, the selection unit 60 compares the length of the bar B or the remaining material BM with the machining length L described in the machining program 53 for fabricating the workpiece W specified in the production schedule SK as a workpiece to be fabricated next, and it determines whether the workpiece W specified in the production schedule SK as a workpiece to be fabricated next can be fabricated. When determining that the workpiece W specified in the production schedule SK as a workpiece to be fabricated next can be fabricated from the remaining material BM of the bar B (step ST1: Yes), the selection unit 60 repeats step ST1. Step ST1 is a determination step of determining, on the basis of the length of the remaining material BM of the bar B, whether the workpiece W specified in the production schedule SK as a workpiece to be fabricated next can be fabricated.

When determining that the workpiece W specified in the production schedule SK as a workpiece to be fabricated next cannot be fabricated from the remaining material BM of the bar B (step ST1: No), the selection unit 60 refers to all the machining programs 53 stored in the storage unit 50 and determines, on the basis of the length of the remaining material BM of the bar B and the machining length L of the workpiece W to be fabricated with each machining program 53, whether there is a machining program 53 for fabricating a workpiece W that can be fabricated from the remaining material BM of the bar B (step ST2). That is, the selection unit 60 determines whether there is another workpiece W that is not specified in the production schedule SK as a workpiece to be fabricated next and can be fabricated from the remaining material BM in step ST2.

When determining that there is not another workpiece W that is not specified in the production schedule SK as a workpiece to be fabricated next and can be fabricated from the remaining material BM of the bar B (step ST2: No), the selection unit 60 terminates the flowchart illustrated in FIG. 11 and causes the automatic lathe 200 to terminate fabrication of the workpiece W.

When determining that there is another workpiece W that is not specified in the production schedule SK as a workpiece to be fabricated next and can be fabricated from the remaining material BM of the bar B (step ST2: Yes), the selection unit 60 determines whether there is only one workpiece W that can be fabricated from the remaining material BM of the bar B (step ST31). When determining that there is only one workpiece W that can be fabricated from the remaining material BM of the bar B (step ST31: Yes), the selection unit 60 selects the machining program 53 for fabricating the other workpiece W that can be fabricated from the remaining material BM of the bar B (step ST33). When determining that there are a plurality of other workpieces W that can be fabricated from the remaining material BM of the bar B (step ST31: No), the selection unit 60 acquires the priority-order information 53D described in the machining programs 53 for fabricating the other workpieces W that can be fabricated from the remaining material BM of the bar B (step ST32). The selection unit 60 selects, on the basis of the acquired priority-order information 53D, the machining program 53 for fabricating a workpiece with a higher priority order, in particular, a workpiece W having the highest priority order (step ST33). As described above, steps ST31, ST32, and ST33 constitutes a selection step ST3 of selecting, when it is determined that the workpiece W specified in the production schedule SK as a workpiece to be fabricated next cannot be fabricated in step ST1, a workpiece W that can be fabricated from the remaining material BM from among the other workpieces W on the basis of the information 53C indicating the machining lengths L of the other workpieces W and the length of the remaining material BM, and selecting, when there are a plurality of workpieces W that can be fabricated from the remaining material BM, a workpiece W on the basis of the priority.

The selection unit 60 executes the machining program 53 selected in step ST3 to issue an instruction to fabricate the workpiece W (step ST4) and returns to step ST2. The selection unit 60 repeats steps ST2 to ST4 until determining that there is no machining program 53 for fabricating the workpiece W that can be fabricated from the remaining material BM of the bar B in step ST2 (step ST2: No). As described above, the program 56 is for causing the numerical control apparatus 1, which is a computer, to execute steps ST1 and ST3.

The numerical control apparatus 1 according to the first embodiment selects, when the workpiece W specified in the production schedule SK cannot be fabricated from the remaining material BM and there are a plurality of other workpieces W that can be fabricated from the remaining material BM, a workpiece W on the basis of the priority. Thus, with the numerical control apparatus 1 according to the first embodiment, it is possible to fabricate a workpiece W from the remaining material BM depending on the priority. As the result, with the numerical control apparatus 1 according to the first embodiment, it is possible to effectively use the remaining material BM.

In addition, with the numerical control apparatus 1 according to the first embodiment, since a workpiece W that can be fabricated from the remaining material BM is selected on the basis of the machining lengths L of the other workpieces W and the length of the remaining material BM, it is possible to fabricate a workpiece W that can be fabricated from the remaining material BM and to effectively use the remaining material BM.

Furthermore, with the numerical control apparatus 1 according to the first embodiment, since the information 53C indicating the machining lengths L of workpieces W is a part of the machining program 53, it is possible to determine the machining length L of each workpiece W by referring to the machining program 53. In addition, with the numerical control apparatus 1 according to the first embodiment, since the machining length L of a workpiece W can be determined with the simulation function, it is possible to manage the machining length L without describing it in the machining program 53.

Furthermore, in the numerical control apparatus 1 according to the first embodiment, the priority-order information 53D indicating the priority order of workpieces W is described in the machining program 53 and stored in the storage unit 50. Thus, with the numerical control apparatus 1 according to the first embodiment, it is possible to determine the priority order of workpieces W by referring to the machining program 53.

In addition, with the numerical control apparatus 1 according to the first embodiment, since a workpiece with a higher priority order, in particular, a workpiece W having the highest priority order is selected on the basis of the priority-order information 53D when there are a plurality of other workpieces W that can be fabricated from the remaining material BM, it is possible to fabricate a workpiece W from the remaining material BM depending on the priority. As the result, with the numerical control apparatus 1 according to the first embodiment, it is possible to perform machining with high production efficiency.

In the present embodiment, the machining facility 100 includes, as illustrated in FIG. 1, the automatic lathes 200 controlled by the numerical control apparatuses 1; the numerical control apparatuses 1; and the production management computer 300, and the numerical control apparatuses 1 and the production management computer 300 are connected by the network N, but the machining facility 100 is not limited to this configuration. For example, the machining facility 100 may include only one numerical control apparatus 1 and one automatic lathe 200 controlled by the numerical control apparatus 1. In this case, the numerical control apparatus 1 that is the selection apparatus stores at least one of the production schedule SK and the interrupt information stored in the production management computer 300. In particular, the numerical control apparatus 1 stores at least one of the production schedule SK and the interrupt information in a storage unit 50 illustrated in FIG. 2. In this case, the production management computer 300 illustrated in FIG. 2 is unnecessary. The numerical control apparatus 1 selects, on the basis of at least one of the production schedule SK and the interrupt information, another machining program 53 different from the machining program 53 with which a workpiece W cannot be fabricated. The configuration disclosed in the first embodiment can also be appropriately applied to the following embodiments.

Second Embodiment

Figure 12:
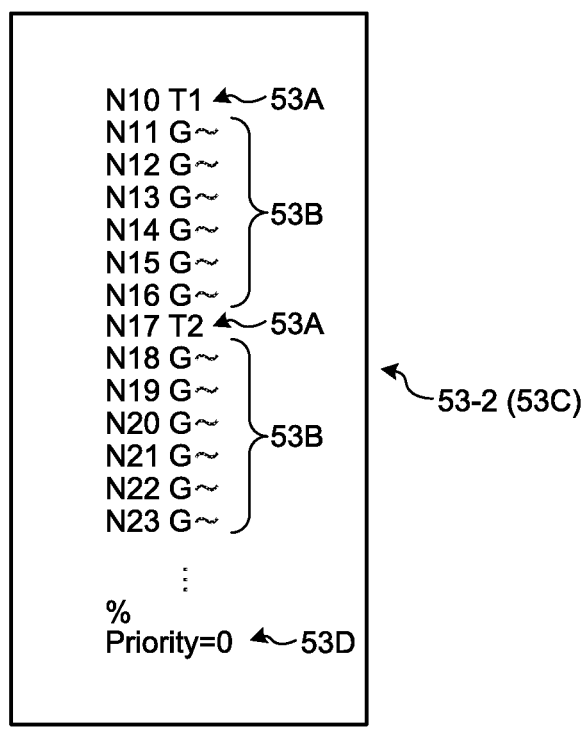
FIG. 12 is a diagram illustrating a part of the fourth machining program stored in the storage unit of the numerical control apparatus that is the selection apparatus according to a second embodiment.
Figure 13:
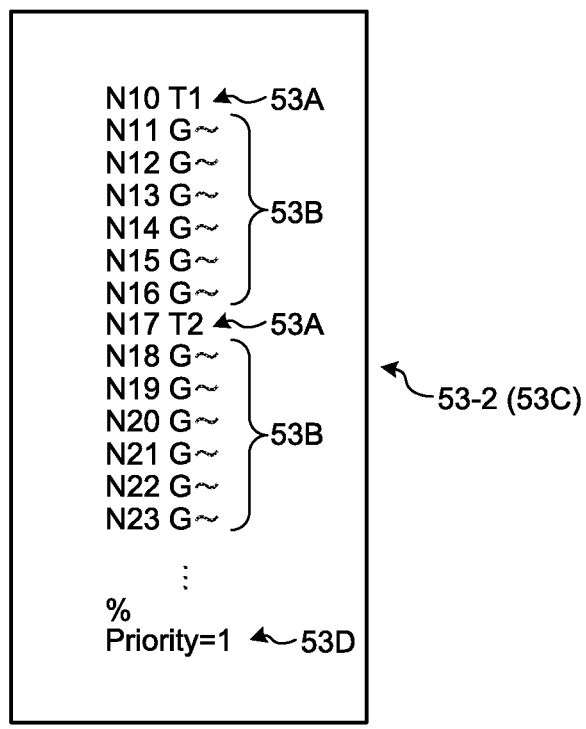
FIG. 13 is a diagram illustrating a part of the fifth machining program stored in the storage unit of the numerical control apparatus that is the selection apparatus according to the second embodiment.
Figure 14:
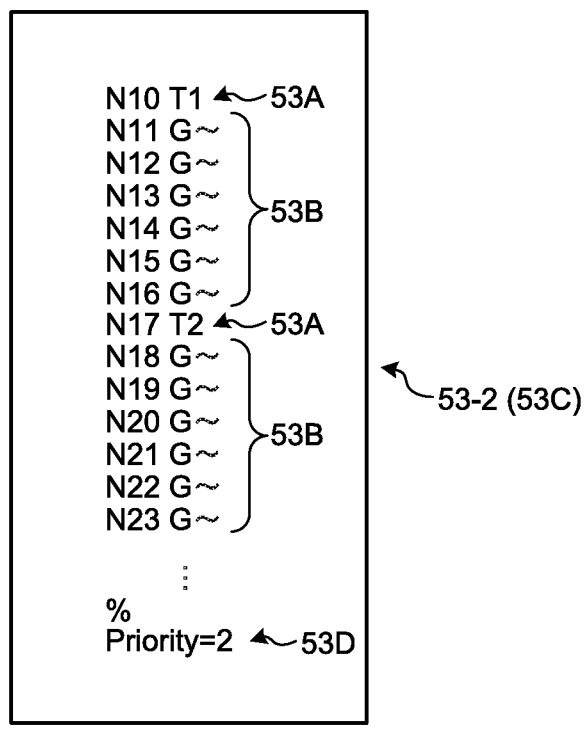
FIG. 14 is a diagram illustrating a part of the sixth machining program stored in the storage unit of the numerical control apparatus that is the selection apparatus according to the second embodiment.

Next, the numerical control apparatus 1 that is the selection apparatus according to a second embodiment is described with reference to the drawings. FIG. 12 is a diagram illustrating a part of a fourth machining program stored in the storage unit of the numerical control apparatus that is the selection apparatus according to the second embodiment. FIG. 13 is a diagram illustrating a part of a fifth machining program stored in the storage unit of the numerical control apparatus that is the selection apparatus according to the second embodiment. FIG. 14 is a diagram illustrating a part of a sixth machining program stored in the storage unit of the numerical control apparatus that is the selection apparatus according to the second embodiment. In FIGS. 12 to 14, the same components as those in the first embodiment are denoted by the same reference signs, and the description thereof is omitted.

As illustrated in FIGS. 12, 13, and 14, the numerical control apparatus 1 according to the second embodiment has the same configuration as the configuration in the first embodiment except that the automatic lathe 200 calculates the information 53C indicating the machining length L of a workpiece W on the basis of a machining program 53-2 for fabricating the workpiece W, without the information 53C indicating the machining length L of the workpiece W being described in the machining program 53-2. The numerical control apparatus 1 according to the second embodiment analyzes each block of the machining program 53-2 and calculates the machining length L of the workpiece W. In order for the numerical control apparatus 1 to calculate the machining length L of the workpiece W by analyzing each block of the machining program 53-2, the machining program 53-2 itself is the information including the machining length L of the workpiece W in the second embodiment.

In the second embodiment, the numerical control apparatus 1 calculates the machining length L of each workpiece W, but may calculate the outer shape including the machining length L of the fabricated workpiece W by analyzing each block of the machining program 53-2 with the simulation function and display the calculated outer shape of the workpiece W on the display screen 10a of the display 10. With the numerical control apparatus 1 according to the second embodiment, since the machining length L of a workpiece W can be determined with the simulation function, it is possible to manage the machining length L without describing it in the machining program 53-2.

With the numerical control apparatus 1 according to the second embodiment, when the workpiece W specified in the production schedule SK cannot be fabricated from the remaining material BM and there are a plurality of other workpieces W that can be fabricated from the remaining material BM, a workpiece W selected on the basis of the priority similarly to the first embodiment is fabricated, and it is thus possible to effectively use the remaining material BM.

In addition, with the numerical control apparatus 1 according to the second embodiment, since a machining-program analysis processing unit 62 calculates the information 53C indicating the machining length L of a workpiece W on the basis of the machining program 53-2, the information 53C indicating the machining length L of the workpiece W does not need to be described in the program 53-2 beforehand. The configuration disclosed in the second embodiment can also be appropriately applied to the following embodiments.

Third Embodiment

Figure 15:
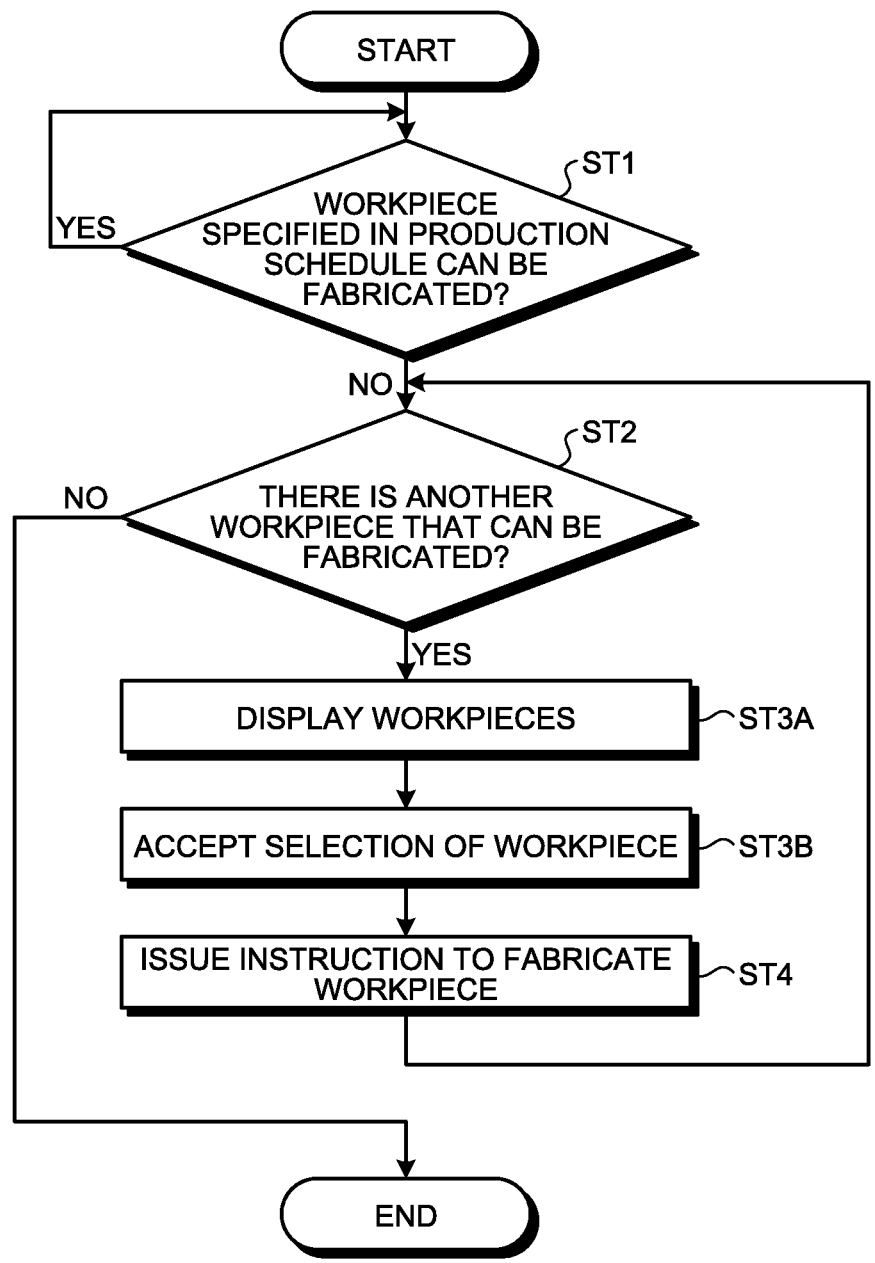
FIG. 15 is a flowchart illustrating a method for selecting another workpiece performed by the selection unit of the numerical control apparatus that is the selection apparatus according to a third embodiment.
Figure 16:
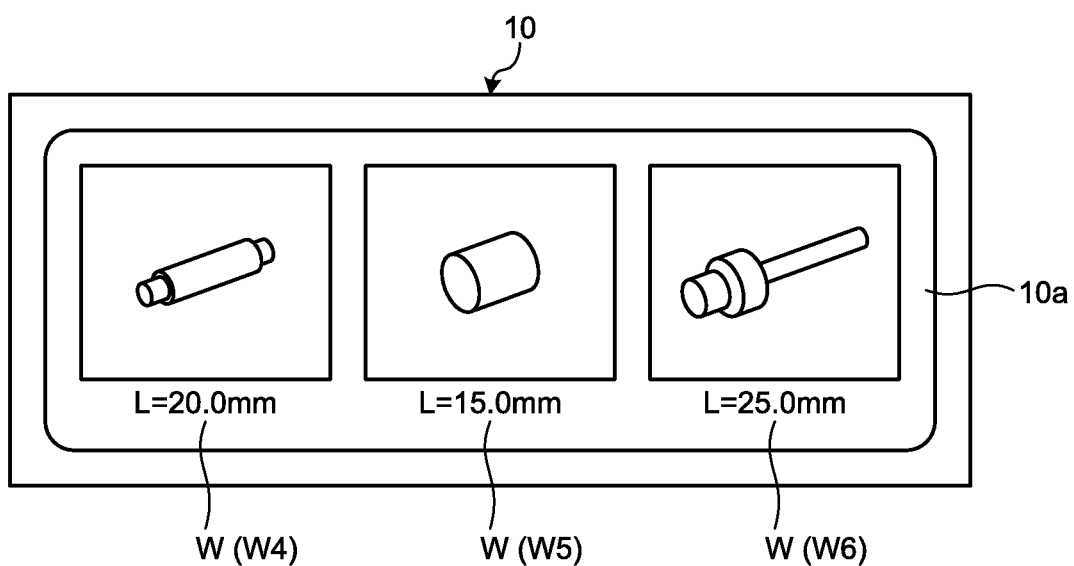
FIG. 16 is a diagram illustrating a state where workpieces that can be fabricated from a remaining material are displayed on a display screen of a display in step ST3A of FIG. 15.

Next, the numerical control apparatus 1 that is the selection apparatus according to a third embodiment is described with reference to the drawings. FIG. 15 is a flowchart illustrating a method for selecting another workpiece performed by the selection unit of the numerical control apparatus that is the selection apparatus according to the third embodiment. FIG. 16 is a diagram illustrating a state where other workpieces that can be fabricated from the remaining material are displayed on the display screen of the display in step ST3A of FIG. 15. In FIGS. 15 and 16, the same components as those in the first embodiment are denoted by the same reference signs, and the description thereof is omitted.

The numerical control apparatus 1 according to the third embodiment has the same configuration as the configuration in the first embodiment except for a part of the method for selecting another workpiece W when the workpiece W specified in the production schedule SK as a workpiece to be fabricated next cannot be fabricated from the remaining material BM of the bar B.

The selection unit 60 of the numerical control apparatus 1 according to the third embodiment performs step ST1 and, then, performs step ST2 when the workpiece W specified in the production schedule SK as a workpiece to be fabricated next cannot be fabricated from the remaining material BM of the bar B, similarly to the first embodiment. When determining that there is another workpiece W that is not specified in the production schedule SK as a workpiece to be fabricated next and can be fabricated from the remaining material BM of the bar B (step ST2: Yes), the selection unit 60 of the numerical control apparatus 1 according to the third embodiment displays information indicating workpieces W that can be fabricated from the remaining material BM of the bar B on the display screen 10a of the display 10 as illustrated in FIG. 16 (step ST3A).

In the third embodiment, the selection unit 60 of the numerical control apparatus 1 displays information indicating the fourth workpiece W4, information indicating the fifth workpiece W5, and the sixth workpiece W6 on the display screen 10a of the display 10. In the third embodiment, with the use of the simulation function, the selection unit 60 of the numerical control apparatus 1 displays, on the display screen 10a of the display 10, the outer shape and the machining length L of the fourth workpiece W4 calculated by analyzing each block of the fourth machining program 534, the outer shape and the machining length L of the fifth workpiece W5 calculated by analyzing each block of the fifth machining program 535, and the outer shape and the machining length L of the sixth workpiece W6 calculated by analyzing each block of the sixth machining program 536, but the information indicating workpieces W displayed on the display screen 10a of the display 10 is not limited thereto.

The selection unit 60 of the numerical control apparatus 1 according to the third embodiment accepts that one of the workpieces W displayed on the display screen 10a of the display 10 is selected from the input device 20 (step ST3B). The selection unit 60 of the numerical control apparatus 1 according to the third embodiment executes the machining program 53 for fabricating the workpiece W accepted in step ST3B to issue an instruction to fabricate the workpiece W (step ST4), and returns to the step ST2. The selection unit 60 repeats steps ST2 to ST4 until determining that there is no machining program 53 for fabricating the workpiece W that can be fabricated from the remaining material BM of the bar B in step ST2 (step ST2: No), similarly to the first embodiment.

In the numerical control apparatus 1 according to the third embodiment, when the workpiece W specified in the production schedule SK cannot be fabricated from the remaining material BM and there are a plurality of other workpieces W that can be fabricated from the remaining material BM, the information about the other workpieces W that can be fabricated is displayed on the display screen 10a of the display 10, and the workpiece W selected from the input device 20 is fabricated. Thus, with the numerical control apparatus 1 according to the third embodiment, it is possible to fabricate a workpiece W from the remaining material BM depending on the priority. As the result, with the numerical control apparatus 1 according to the third embodiment, it is possible to effectively use the remaining material BM. The configuration disclosed in the third embodiment can also be appropriately applied to the following embodiments.

Fourth Embodiment

Figure 17:
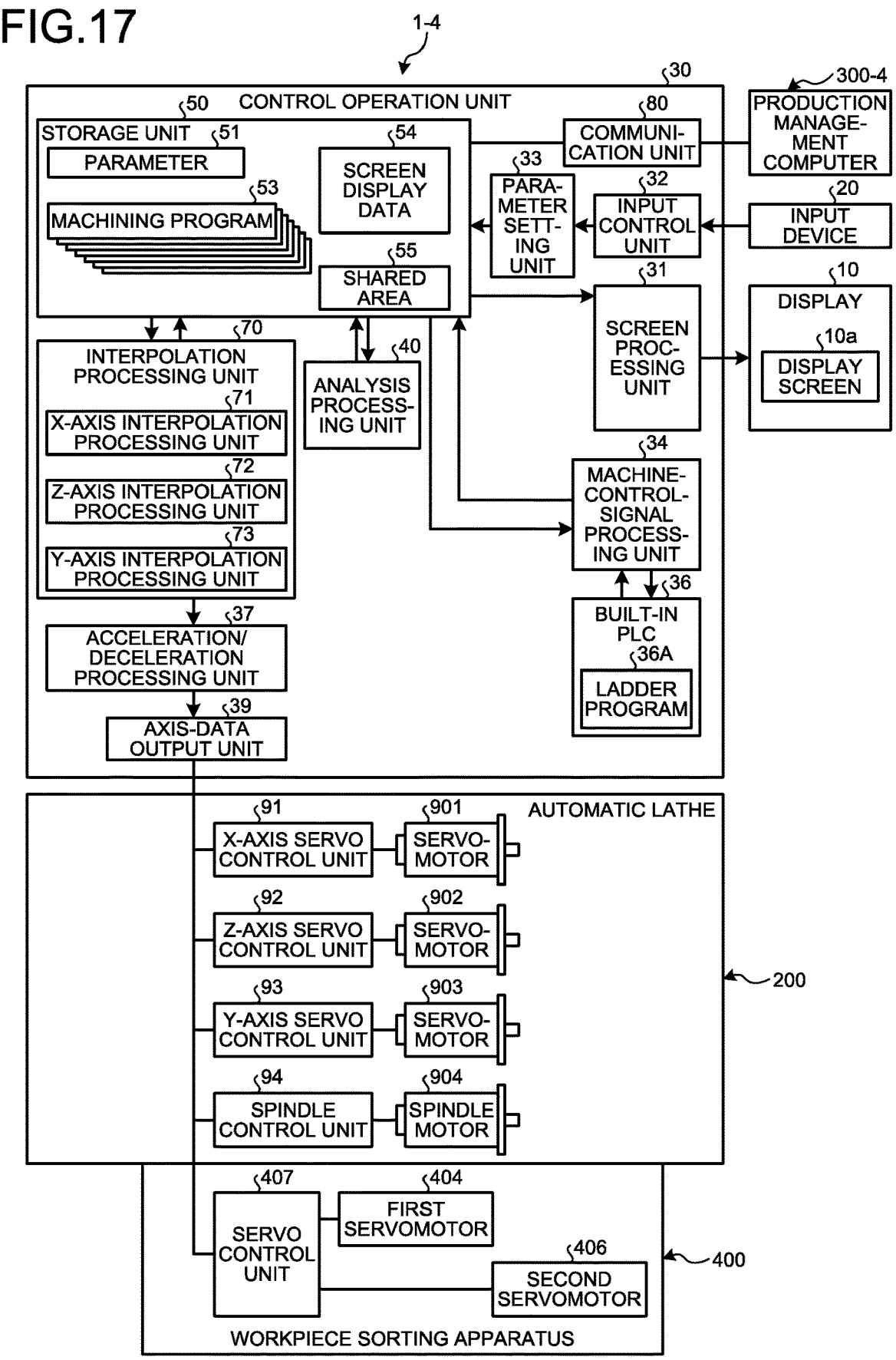
FIG. 17 is a functional block diagram illustrating a configuration of a part of a machining facility including a production management computer that is the selection apparatus according to a fourth embodiment.
Figure 18:
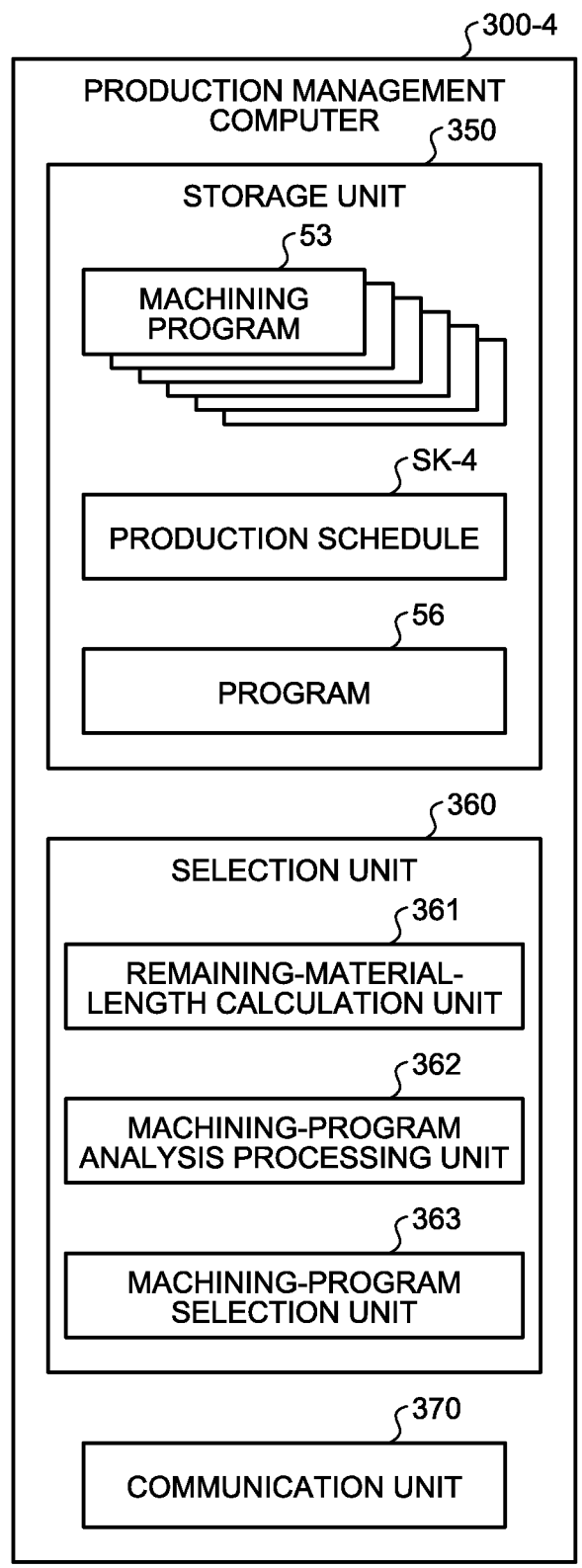
FIG. 18 is a functional block diagram illustrating a configuration of the production management computer that is the selection apparatus according to the fourth embodiment.
Figure 19:
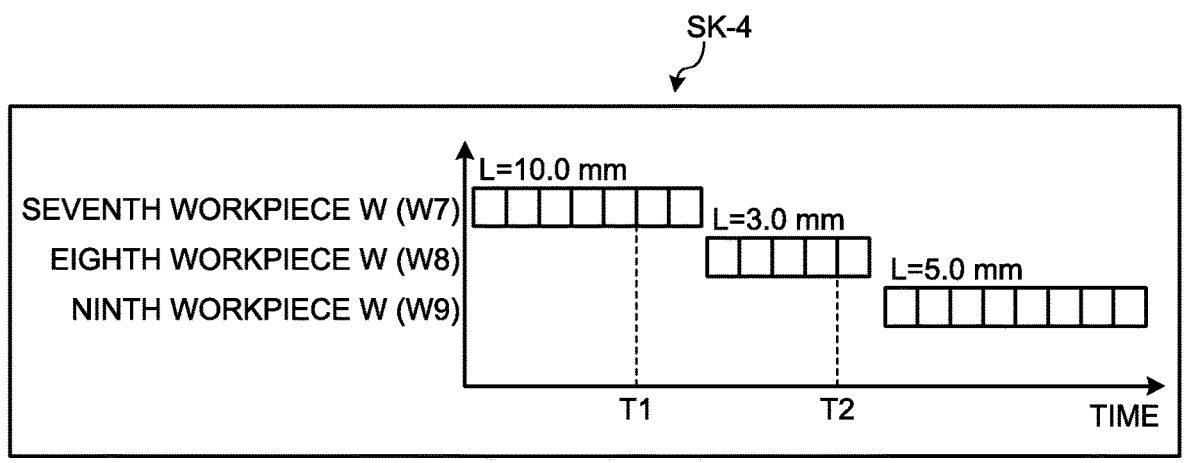
FIG. 19 is a diagram illustrating an example of a production schedule stored in the production management computer illustrated in FIG. 18.

Next, a production management computer 300-4 that is the selection apparatus according to a fourth embodiment is described with reference to the drawings. FIG. 17 is a functional block diagram illustrating a configuration of a part of the machining facility including the production management computer that is the selection apparatus according to the fourth embodiment. FIG. 18 is a functional block diagram illustrating a configuration of the production management computer that is the selection apparatus according to the fourth embodiment. FIG. 19 is a diagram illustrating an example of a production schedule stored in the production management computer illustrated in FIG. 18. In FIGS. 17 to 19, the same components as those in the first embodiment are denoted by the same reference signs, and the description thereof is omitted.

When the automatic lathe 200 cannot fabricate the workpiece W specified in the production schedule SK as a workpiece to be fabricated next from the bar B, instead of the numerical control apparatuses 1 according to the first to third embodiments, the production management computer 300-4 that is the selection apparatus according to the fourth embodiment selects another workpiece W that is not specified in the production schedule SK as a workpiece to be fabricated next from the remaining material BM using the automatic lathe 200. As illustrated in FIG. 17, a numerical control apparatus 1-4 according to the fourth embodiment has the same configuration as the configuration of the numerical control apparatus 1 in the first embodiment except that the numerical control apparatus 1-4 does not include the selection unit 60 and the storage unit 50 does not store the program 56.

As illustrated in FIG. 18, the production management computer 300-4 that is the selection apparatus according to the fourth embodiment includes a storage unit 350, a selection unit 360, and a communication unit 370. The selection unit 360 selects another workpiece W that is not specified in the production schedule SK as a workpiece to be fabricated next from the remaining material BM of the bar B when each automatic lathe 200 cannot fabricate the workpiece W specified in the production schedule SK as a workpiece to be fabricated next. The communication unit 370 communicates with the communication unit 80 of the numerical control apparatus 1-4. The storage unit 350 stores all the machining programs 53 stored by all the numerical control apparatuses 1-4 managed by the production management computer 300-4, production schedules SK-4 of all the numerical control apparatuses 1-4 managed by the production management computer 300-4, and the program 56 to be executed when the selection unit 360 selects another workpiece W. The storage unit 350 stores the machining programs 53 and the production schedules SK-4 in association with the numerical control apparatuses 1-4.

One production schedule SK-4 stored by the production management computer 300-4 illustrated in FIG. 19 corresponds to any one of the numerical control apparatuses 1-4. The production schedule SK-4 illustrated in FIG. 19 indicates that seven seventh workpieces W7 having the machining length L of 10.0 mm are fabricated, then five eighth workpieces W8 having the machining length L of 3.0 mm are fabricated, and then eight ninth workpieces W9 having the machining length L of 5.0 mm are fabricated. The seventh workpieces W7, the eighth workpieces W8, and the ninth workpieces W9 are other workpieces W.

The selection unit 360 selects, from the other workpieces W, a workpiece W that can be fabricated by each automatic lathe 200 on the basis of the information 53C indicating the machining lengths L of the other workpieces W and the length of the remaining material BM. As illustrated in FIG. 18, the selection unit 360 includes a remaining-material-length calculation unit 361 that calculates the length of the remaining material BM of the bar B for each automatic lathe 200; a machining-program analysis processing unit 362 that determines whether each automatic lathe 200 can fabricate the workpiece W specified in the production schedule SK-4 as a workpiece to be fabricated next; and a machining-program selection unit 363. When there is an automatic lathe 200 determined to be unable to fabricate the workpiece W specified in the production schedule SK-4 as a workpiece to be fabricated next, the machining-program selection unit 363 selects, on the basis of the length of the remaining material BM of the bar B and the machining lengths L of all workpieces W to be fabricated with the machining programs 53 stored in the storage unit 350, another workpiece W that can be fabricated using the automatic lathe 200 determined to be unable to fabricate the workpiece W specified in the production schedule SK-4 as a workpiece to be fabricated next. When an automatic lathe 200 determined to be unable to fabricate the workpiece W specified in the production schedule SK-4 as a workpiece to be fabricated next can fabricate a plurality of other workpieces W, the machining-program selection unit 363 selects the machining program 53 for fabricating the workpiece W specified in the production schedule SK-4 corresponding to another automatic lathe 200, which is another machine tool, as a workpiece to be fabricated earliest. The machining-program selection unit 363 outputs the selected machining program 53 to the numerical control apparatus 1-4 connected to the automatic lathe 200 determined to be unable to fabricate the workpiece W specified in the production schedule SK-4 as a workpiece to be fabricated next, so as to cause the automatic lathe 200 to fabricate the selected workpiece W.

In this manner, the selection unit 360 of the production management computer 300-4 according to the fourth embodiment selects, for the automatic lathe 200 determined to be unable to fabricate the workpiece W specified in the production schedule SK-4 as a workpiece to be fabricated next from the remaining material BM of the bar B, a workpiece W specified in the production schedule SK-4 corresponding to another automatic lathe 200, which is different from the automatic lathe 200 that cannot fabricate the workpiece W, as a workpiece to be fabricated earliest and determined by the machining-program selection unit 363 to be able to be fabricated, so as to cause the other automatic lathe 200 to fabricate the selected workpiece W.

The selection unit 360 of the production management computer 300-4 determines that the automatic lathe 200 connected to one numerical control apparatus 1-4 cannot fabricate the workpiece W specified in the production schedule SK-4. At time T1 in FIG. 19, when another automatic lathe 200 is fabricating the seventh workpiece W7 and the automatic lathe 200 connected to one numerical control apparatus 1-4 can fabricate the seventh workpiece W7, the selection unit 360 of the production management computer 300-4 selects the seventh workpiece W7. In addition, at time T2 in FIG. 19, when another automatic lathe 200 is fabricating the eighth workpiece W8 and the automatic lathe 200 connected to one numerical control apparatus 1-4 can fabricate the eighth workpiece W8, the selection unit 360 of the production management computer 300-4 selects the eighth workpiece W8. In addition, the selection unit 360 of the production management computer 300-4 manages the number of fabricated workpieces W and selects another workpiece W such that extra workpieces W are not to be fabricated.

With the numerical control apparatus 1-4 according to the fourth embodiment, since the automatic lathe 200 that cannot fabricate the workpiece W specified in the production schedule SK-4 as a workpiece to be fabricated next from the remaining material BM is caused to fabricate the workpiece W that can be fabricated and specified in the production schedule SK-4 for another automatic lathe 200 as a workpiece to be fabricated earliest, that is, the workpiece W having the highest priority, it is possible to effectively use the remaining material BM. The configuration disclosed in the fourth embodiment can also be appropriately applied to the following embodiments.

Fifth Embodiment

Figure 20:
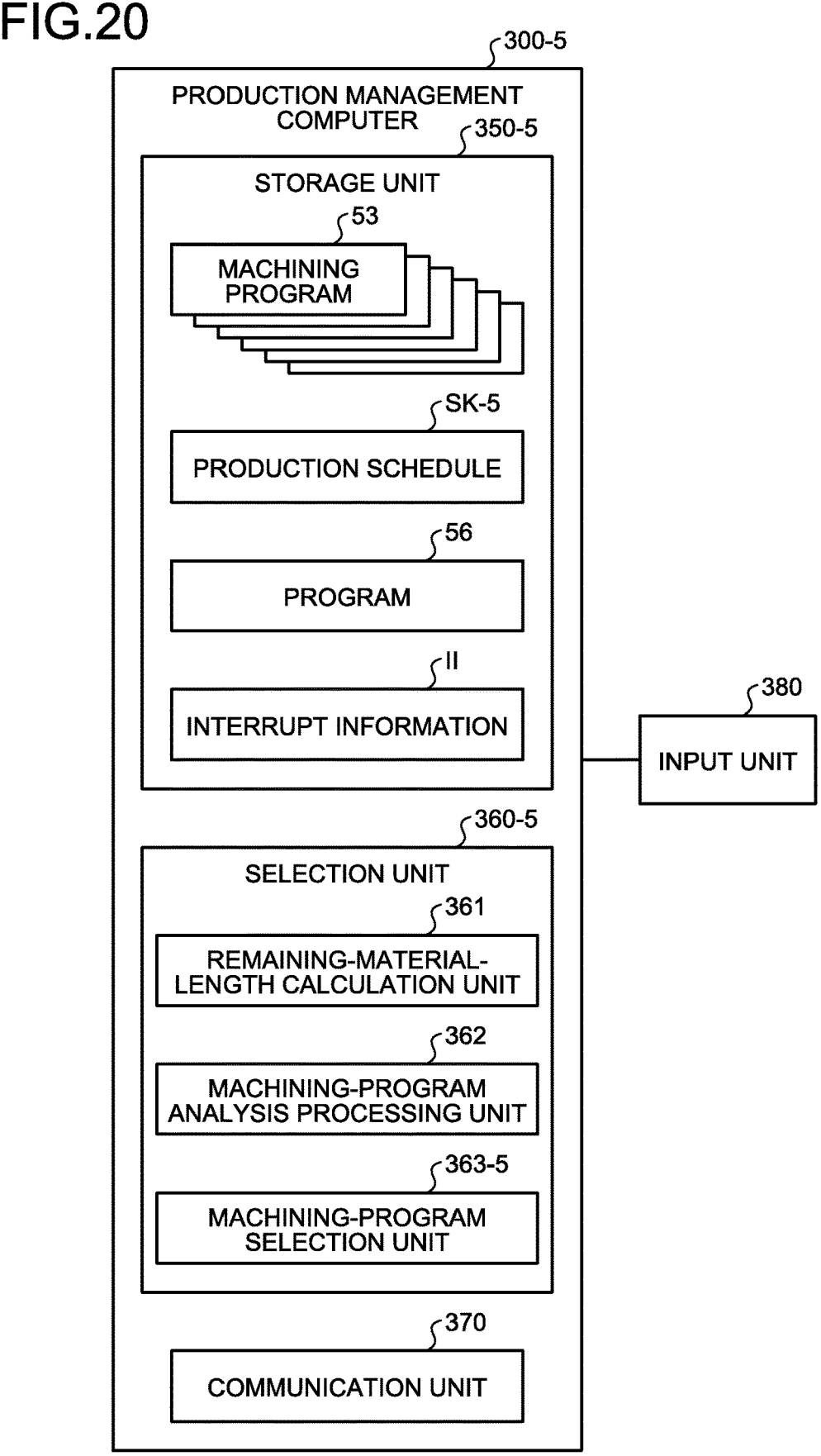
FIG. 20 is a functional block diagram illustrating a configuration of a production management computer that is the selection apparatus according to a fifth embodiment.

Next, a production management computer 300-5 that is the selection apparatus according to a fifth embodiment is described with reference to the drawings. FIG. 20 is a functional block diagram illustrating a configuration of the production management computer that is the selection apparatus according to the fifth embodiment. In FIG. 20, the same components as those in the fourth embodiment are denoted by the same reference signs, and the description thereof is omitted.

As illustrated in FIG. 20, a storage unit 350-5 of the production management computer 300-5 that is the selection apparatus according to the fifth embodiment includes a storage area capable of storing interrupt information II. The interrupt information II indicates the priority order of workpieces W to be fabricated from the remaining material BM of the bar B when each automatic lathe 200 cannot fabricate the workpiece W specified in a production schedule SK-5 as a workpiece to be fabricated next. The interrupt information II indicates, separately from the production schedule SK, the workpieces W to be fabricated immediately by the operation from an input unit 380.

When there is an automatic lathe 200 determined to be unable to fabricate the workpiece W specified in the production schedule SK-5 as a workpiece to be fabricated next, a machining-program selection unit 363-5 of a selection unit 360-5 of the production management computer 300-5 determines, on the basis of the length of the remaining material BM of the bar B and the machining lengths L of all the workpieces W to be fabricated with the machining programs 53 stored in the storage unit 350-5, whether the workpieces W specified in the interrupt information II can be fabricated from the remaining material BM, and selects a workpiece W specified in the interrupt information II, determined to be able to be fabricated from the remaining material BM, and having the highest priority.

In this manner, the selection unit 360-5 of the production management computer 300-5 according to the fifth embodiment selects, for the automatic lathe 200 that cannot fabricate the workpiece W specified in the production schedule SK-5 as a workpiece to be fabricated next, a workpiece having a high priority order in the interrupt information II, in particular, a workpiece W having the highest priority.

With the numerical control apparatus 1 according to the fifth embodiment, since the automatic lathe 200 that cannot fabricate the workpiece W specified in the production schedule SK-5 from the remaining material BM is caused to fabricate a workpiece W that can be fabricated and has the higher priority order of the interrupt information II, that is, a workpiece W having the highest priority, it is possible to effectively use the remaining material BM and to efficiently perform machining. The configuration disclosed in the fifth embodiment can also be appropriately applied to the following embodiment.

Sixth Embodiment

Figure 21:
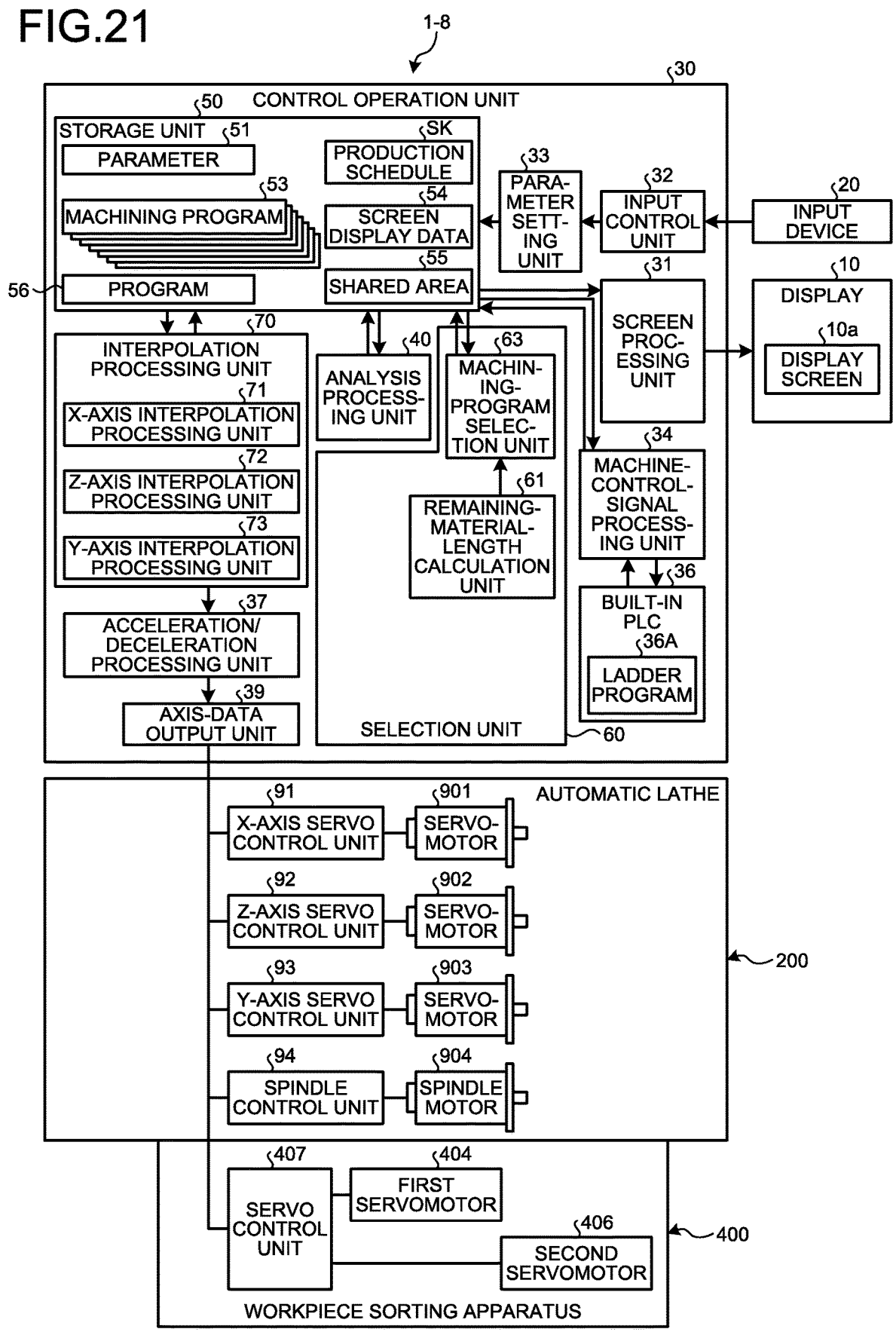
FIG. 21 is a functional block diagram illustrating a configuration of a numerical control apparatus that is the selection apparatus according to a sixth embodiment.

Next, a numerical control apparatus 1-8 that is the selection apparatus according to a sixth embodiment is described with reference to the drawings. FIG. 21 is a functional block diagram illustrating a configuration of the numerical control apparatus that is the selection apparatus according to the sixth embodiment. In FIG. 21, the same components as those in the first embodiment are denoted by the same reference signs, and the description thereof is omitted.

The numerical control apparatus 1-8 that is the selection apparatus according to the sixth embodiment has the same configuration as the configuration in the first embodiment except that the production schedule SK is stored in the storage unit 50, and performs the same processing as the processing in the first embodiment.

With the numerical control apparatus 1-8 according to the sixth embodiment, when the workpiece W specified in the production schedule SK cannot be fabricated from the remaining material BM and there are a plurality of other workpieces W that can be fabricated from the remaining material BM, a workpiece W selected on the basis of the priority is fabricated similarly to the first embodiment, and it is possible to effectively use the remaining material BM.

Figure 22:
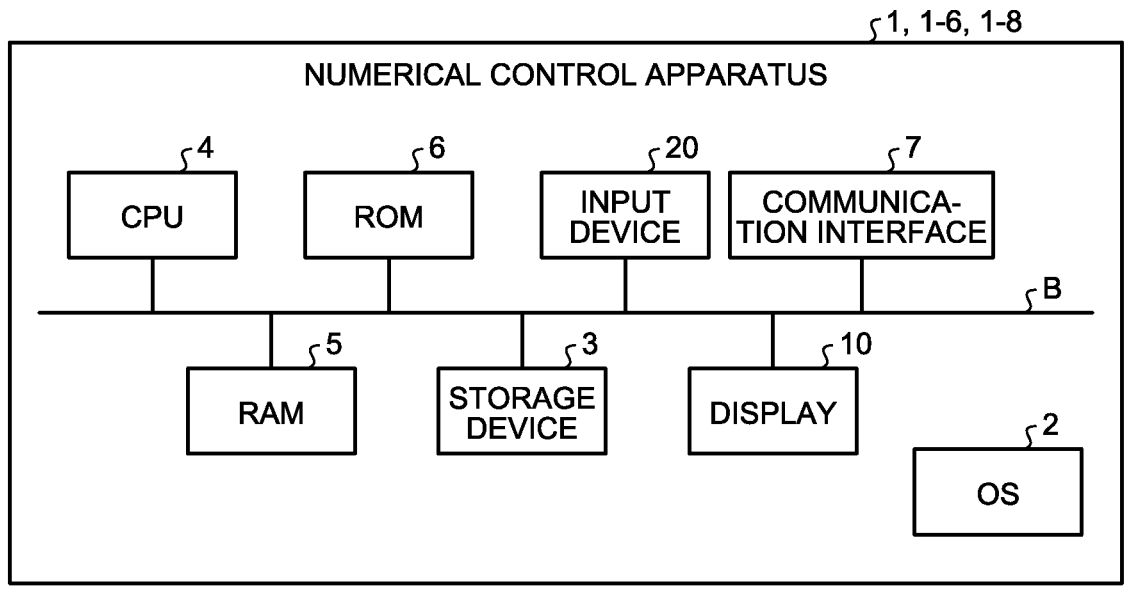
FIG. 22 is a diagram illustrating a hardware configuration of the numerical control apparatus that is the selection apparatus according to each embodiment.

Next, the numerical control apparatuses 1, 1-4, and 1-6 according to the first embodiment to the third embodiment, the fourth embodiment, and the sixth embodiment are described with reference to FIG. 22. FIG. 22 is a diagram illustrating a hardware configuration of the numerical control apparatus that is the selection apparatus according to each embodiment. The numerical control apparatuses 1, 1-4, and 1-6 according to the respective embodiments each are a computer that executes computer programs on an Operating System (OS) 2 and includes, as illustrated in FIG. 22, the display 10, the input device 20, a storage device 3, a Central Processing Unit (CPU) 4, a Random Access Memory (RAM) 5, a Read Only Memory (ROM) 6, and a communication interface 7. The CPU 4, the RAM 5, the ROM 6, the storage device 3, the display 10, the input device 20, and the communication interface 7 are connected via a bus B.

The functions of the screen processing unit 31, the input control unit 32, the parameter setting unit 33, the machine-control-signal processing unit 34, the interpolation processing unit 70, the acceleration/deceleration processing unit 37, and the axis-data output unit 39 of the control operation unit 30 are performed by the CPU 4 executing programs stored in the ROM 6 and the storage device 3 while the CPU 4 uses the RAM 5 as a work area. The programs are implemented by software, firmware, or a combination of software and firmware. The function of the selection unit 60 is performed by the CPU 4 executing the program 56 stored in the ROM 6 and the storage device 3 while the CPU 4 uses the RAM 5 as a work area. The program 56 is implemented by software, firmware, or a combination of software and firmware. In each embodiment, the storage device 3 is a Solid State Drive (SSD), a Hard Disk Drive (HDD), a Dynamic Random Access Memory (DRAM) or a Static Random Access Memory (SRAM), but the storage device 3 is not limited to an SSD or an HDD. The function of the storage unit 50 is implemented by the ROM 6 and the storage device 3.

The display 10 displays characters and images. In each embodiment, the display 10 is exemplified as a liquid crystal display. The communication interface 7 performs the function of the communication unit 80. The input device 20 accepts an operation input from a user. The input device 20 is constituted by a touch panel, a keyboard, a mouse, a trackball, or a combination thereof.

Figure 23:
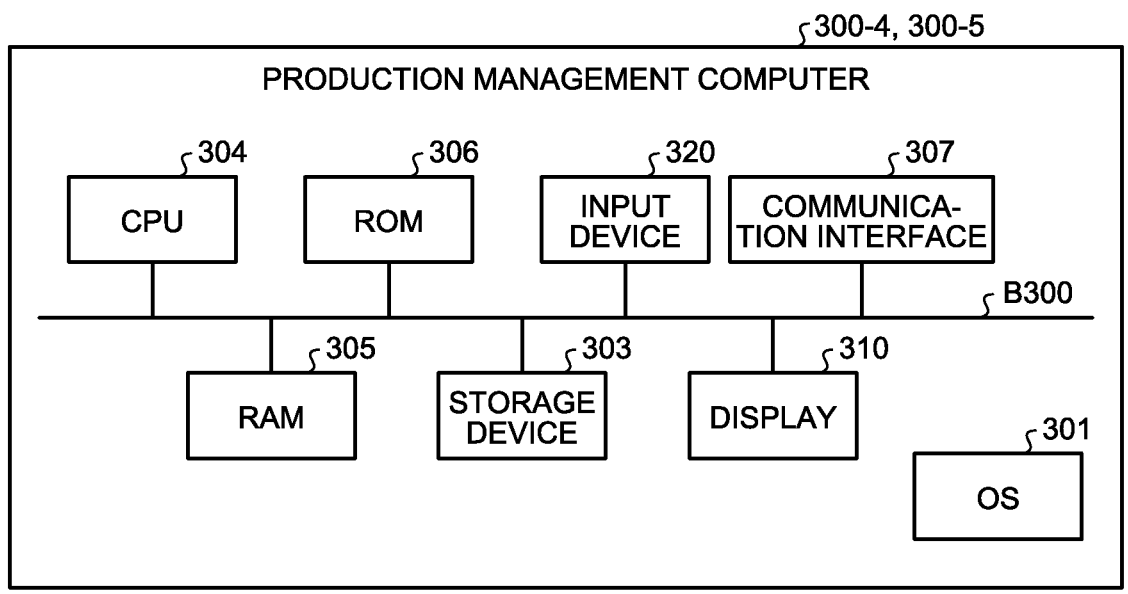
FIG. 23 is a diagram illustrating a hardware configuration of the production management computer that is the selection apparatus according to each embodiment.

Next, with reference to FIG. 23, the production management computers 300-4 and 300-5 according to the fourth and fifth embodiment are described. FIG. 23 is a diagram illustrating a hardware configuration of the production management computer that is the selection apparatus according to each embodiment. The production management computers 300-4 and 300-5 according to the respective embodiments each are a computer that executes computer programs on the OS 301 and includes, as illustrated in FIG. 23, a display 310, an input device 320, a storage device 303, a CPU 304, a RAM 305, a ROM 306, and a communication interface 307. The CPU 304, the RAM 305, the ROM 306, the storage device 303, the display 310, the input device 320, and the communication interface 307 are connected via a bus B300.

The functions of the selection unit 360 and 360-5 are performed by the CPU 304 executing the program 56 stored in the ROM 306 and the storage device 303 while the CPU 304 uses the RAM 305 as a work area. The program 56 is implemented by software, firmware, or a combination of software and firmware. In each embodiment, the storage device 303 is an SSD, an HDD, a DRAM, or an SRAM, but the storage device 303 is not limited to an SSD or an HDD. The functions of the storage units 350 and 350-5 are implemented by the ROM 306 and the storage device 303.

The display 310 displays characters and images. In each embodiment, the display 310 is exemplified as a liquid crystal display. The communication interface 307 performs the function of the communication unit 370. The input device 320 performs the function of the input unit 380. The input device 320 accepts an operation input from a user. The input device 320 is constituted by a touch panel, a keyboard, a mouse, a trackball, or a combination thereof.

The configurations described in the above embodiments are merely examples of an aspect of the present invention and can be combined with other known techniques, and part of the configurations can be omitted or changed without departing from the gist of the present invention.

REFERENCE SIGNS LIST 1, 1-4, 1-6, 1-8 numerical control apparatus (selection apparatus computer); 30 control operation unit (control unit); 50, 350, 350-5, 350-7 storage unit; 53, 53-2, 534, 535, 536, 534-6, 535-6, 536-6 machining program; 53C information indicating machining length; 53D priority-order information; 56 program; 57 mounting tool data; 60, 360, 360-5, 360-7 selection unit; 200 automatic lathe (machine tool); 207 machining tool (tool); 300, 300-4, 300-5 production management computer (selection apparatus computer); 400 workpiece sorting apparatus; 402 workpiece storage; 402a storage; B bar; BM remaining material; SK, SK-4, SK-5, SK-7 production schedule; L machining length; W, W1, W2, W3 workpiece defined in production schedule; W, W4, W5, W6, W7, W8, W9 other workpieces; II interrupt information; T, T1, T2, T3, T4 mounting position; ST1 determination step; ST3 selection step.

The invention claimed is:
1. A selection apparatus comprising:
processing circuitry configured as a selector to select, when a machine tool that fabricates a workpiece from a bar is unable to fabricate a workpiece that is a fabrication target from a remaining material that is a remaining part of the bar being machined and when there are a plurality of other workpieces that are able to be fabricated from the remaining material, a workpiece to be fabricated on a basis of a length of the remaining material and priority, wherein
the priority is an order of fabricating workpieces specified in a production schedule.
2. The selection apparatus according to claim 1, wherein the selector further selects the workpiece to be fabricated on a basis of information indicating machining lengths of the other workpieces, and
the information indicating the machining lengths of the other workpieces is a part of a machining program.

3. The selection apparatus according to claim 1, wherein the selector further selects the workpiece to be fabricated on a basis of information indicating machining lengths of the other workpieces, and
the information indicating the machining lengths of the other workpieces is calculated on a basis of a machining program.
4. The selection apparatus according to claim 1, wherein the selector selects, as the workpiece to be fabricated, another workpiece having a higher priority order on a basis of priority-order information indicating the priority order of the other workpieces to be fabricated from the remaining material.
5. The selection apparatus according to claim 4, further comprising:
processing circuitry configured as a controller to control a workpiece sorting apparatus that stores a fabricated workpiece in a workpiece storage, wherein
the controller controls the workpiece sorting apparatus such that the workpiece sorting apparatus stores, in a storage corresponding to a type of each workpiece to be stored in the workpiece storage, a corresponding workpiece.
6. The selection apparatus according to claim 1, wherein the selector selects, for a machine tool that is unable to fabricate a workpiece specified in the production schedule among one or more of the machine tools, a workpiece that is able to be fabricated and is specified in the production schedule corresponding to another machine tool, which is different from the machine tool that is unable to fabricate the workpiece, as a workpiece to be fabricated earliest.
7. The selection apparatus according to claim 1, wherein the machine tool fabricates a workpiece specified in the production schedule from the bar.
8. A selection apparatus comprising:
processing circuitry configured as a selector to select, when a machine tool that fabricates a workpiece from a bar is unable to fabricate a workpiece that is a fabrication target from a remaining material that is a remaining part of the bar being machined and when there are a plurality of other workpieces that are able to be fabricated from the remaining material, a workpiece to be fabricated on a basis of a length of the remaining material and priority, wherein
the priority is a priority order of interrupt information.
9. The selection apparatus according to claim 8, wherein the selector further selects the workpiece to be fabricated on a basis of information indicating machining lengths of the other workpieces, and
the information indicating the machining lengths of the other workpieces is a part of a machining program.
10. The selection apparatus according to claim 8, wherein the selector further selects the workpiece to be fabricated on a basis of information indicating machining lengths of the other workpieces, and
the information indicating the machining lengths of the other workpieces is calculated on a basis of a machining program.
11. The selection apparatus according to claim 8, wherein the selector selects, as the workpiece to be fabricated, another workpiece having a higher priority order on a basis of priority-order information indicating the priority order of the other workpieces to be fabricated from the remaining material.

12. The selection apparatus according to claim 11, further comprising:
processing circuitry configured as a controller to control a workpiece sorting apparatus that stores a fabricated workpiece in a workpiece storage, wherein
the controller controls the workpiece sorting apparatus such that the workpiece sorting apparatus stores, in a storage corresponding to a type of each workpiece to be stored in the workpiece storage, a corresponding workpiece.

13. The selection apparatus according to claim 8, wherein
the selector selects, for a machine tool that is unable to fabricate a workpiece specified in a production schedule, a workpiece that is able to be fabricated and has the highest priority order of the interrupt information, and
the interrupt information indicates a priority order of workpieces to be fabricated from the remaining material when the machine tool is unable to fabricate a workpiece specified in the production schedule.

14. The selection apparatus according to claim 8, wherein the machine tool fabricates a workpiece specified in the production schedule from the bar.

15. A selection apparatus comprising:
processing circuitry configured as a selector to select, when a machine tool that fabricates a workpiece from a bar is unable to fabricate a workpiece that is a fabrication target from a remaining material that is a remaining part of the bar being machined and when there are a plurality of other workpieces that are able to be fabricated from the remaining material, a workpiece to be fabricated on a basis of a length of the remaining material and priority, wherein the priority is a priority order for fabricating workpieces specified in a machining program.

16. The selection apparatus according to claim 15, wherein
the selector further selects the workpiece to be fabricated on a basis of information indicating machining lengths of the other workpieces, and
the information indicating the machining lengths of the other workpieces is a part of a machining program.

17. The selection apparatus according to claim 15, wherein
the selector further selects the workpiece to be fabricated on a basis of information indicating machining lengths of the other workpieces, and
the information indicating the machining lengths of the other workpieces is calculated on a basis of a machining program.

18. The selection apparatus according to claim 15, wherein the selector selects, as the workpiece to be fabricated, another workpiece having a higher priority order on a basis of priority-order information indicating the priority order of the other workpieces to be fabricated from the remaining material.

19. The selection apparatus according to claim 15 wherein
the selector selects, in accordance with the priority order specified in the machining program, another machining program different from the machining program with which the workpiece is not able to be fabricated.

20. The selection apparatus according to claim 15, wherein the machine tool fabricates a workpiece specified in the production schedule from the bar.

* * * * *